(12) United States Patent
Conroy et al.

(10) Patent No.: US 9,671,845 B2
(45) Date of Patent: Jun. 6, 2017

(54) METHODS AND APPARATUSES FOR DYNAMIC POWER CONTROL

(71) Applicant: Apple Inc., Cupertino, CA (US)

(72) Inventors: David G. Conroy, El Granada, CA (US); Michael Culbert, Monte Sereno, CA (US); Keith A. Cox, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/149,627

(22) Filed: Jan. 7, 2014

(65) Prior Publication Data

US 2014/0121854 A1     May 1, 2014

Related U.S. Application Data

(60) Division of application No. 11/327,685, filed on Jan. 5, 2006, now Pat. No. 8,662,943, which is a
(Continued)

(51) Int. Cl.
    *G05D 23/19*        (2006.01)
    *G06F 1/26*         (2006.01)
    (Continued)

(52) U.S. Cl.
    CPC ............... *G06F 1/26* (2013.01); *G05D 23/19* (2013.01); *G06F 1/28* (2013.01); *G06F 1/30* (2013.01);
    (Continued)

(58) Field of Classification Search
    CPC ..................................................... G05D 23/19
    (Continued)

(56) References Cited

U.S. PATENT DOCUMENTS

| | | |
|---|---|---|
| 5,167,024 A | 11/1992 | Smith et al. |
| 5,520,153 A | 5/1996 | Milunas |
| | (Continued) | |

FOREIGN PATENT DOCUMENTS

| | | |
|---|---|---|
| EP | 0632 360 A1 | 1/1995 |
| GB | 2405236 A | 2/2005 |
| | (Continued) | |

OTHER PUBLICATIONS

PCT International Preliminary Report and Written Opinion for PCT Int'l. Application No. US2006/029049, mailed Nov. 29, 2006, (14 pages).
(Continued)

*Primary Examiner* — Tejal Gami
(74) *Attorney, Agent, or Firm* — Blakely, Sokoloff, Taylor & Zafman LLP

(57) ABSTRACT

Exemplary embodiments of methods and apparatuses to provide a cooling arrangement for a system are described. The system includes a component coupled to a heat sink. A signal associated with a temperature control of the component is asserted. A target temperature of the heat sink is adjusted based on the signal. In one embodiment, a temperature control loop of the heat sink is operated. The temperature of the heat sink may be monitored using one or more sensors placed on the heat sink. An operation of the component, a cooling unit coupled to the heat sink, or both, may be adjusted based on a relationship between the temperature of the heat sink and an adjusted target temperature. Adjusting the target temperature of the heat sink based on the asserted signal increases efficiency of the system while decreasing cooling.

22 Claims, 39 Drawing Sheets

Related U.S. Application Data continuation-in-part of application No. 11/212,970, filed on Aug. 25, 2005, now Pat. No. 7,562,234.

(51) Int. Cl.
   *G06F 1/32*  (2006.01)
   *G06F 1/28*  (2006.01)
   *G06F 1/30*  (2006.01)

(52) U.S. Cl.
   CPC ............ *G06F 1/3203* (2013.01); *G06F 1/324* (2013.01); *G06F 1/3287* (2013.01); *G06F 1/3296* (2013.01); *Y02B 60/1217* (2013.01); *Y02B 60/1282* (2013.01); *Y02B 60/1285* (2013.01); *Y10T 307/461* (2015.04)

(58) Field of Classification Search
   USPC ................... 700/300, 299; 439/894; 62/129
   See application file for complete search history.

(56) References Cited

U.S. PATENT DOCUMENTS

| | | | |
|---|---|---|---|
| 5,532,935 | A | 7/1996 | Ninomiya et al. |
| 5,532,945 | A | 7/1996 | Robinson |
| 5,560,022 | A | 9/1996 | Dunstan et al. |
| 5,627,412 | A | 5/1997 | Beard |
| 5,812,860 | A | 9/1998 | Horden |
| 5,825,674 | A | 10/1998 | Jackson |
| 5,842,027 | A | 11/1998 | Oprescu et al. |
| 5,915,838 | A | 6/1999 | Stals et al. |
| 5,963,424 | A | 10/1999 | Hileman et al. |
| 5,964,879 | A | 10/1999 | Dunstan et al. |
| 6,006,168 | A * | 12/1999 | Schumann et al. ........... 702/132 |
| 6,058,012 | A * | 5/2000 | Cooper et al. ............... 361/704 |
| 6,122,758 | A | 9/2000 | Johnson et al. |
| 6,134,667 | A | 10/2000 | Suzuki et al. |
| 6,270,252 | B1 | 8/2001 | Siefert |
| 6,415,388 | B1 | 7/2002 | Browning et al. |
| 6,477,156 | B1 | 11/2002 | Ala-Laurila et al. |
| 6,594,771 | B1 | 7/2003 | Koerber et al. |
| 6,718,474 | B1 | 4/2004 | Somers et al. |
| 6,745,117 | B1 | 6/2004 | Thacher et al. |
| 6,888,332 | B2 | 5/2005 | Matsushita |
| 6,925,573 | B2 | 8/2005 | Bodas |
| 6,952,782 | B2 | 10/2005 | Staiger |
| 6,986,069 | B2 | 1/2006 | Oehler et al. |
| 7,036,027 | B2 | 4/2006 | Kim et al. |
| 7,111,178 | B2 | 9/2006 | Rusu et al. |
| 7,134,029 | B2 | 11/2006 | Hepner et al. |
| 7,139,920 | B2 | 11/2006 | Williams |
| 7,162,651 | B2 | 1/2007 | Brockhaus |
| 7,171,570 | B2 | 1/2007 | Cox et al. |
| 7,177,728 | B2 | 2/2007 | Gardner |
| 7,178,043 | B2 | 2/2007 | Nakazato |
| 7,194,646 | B1 | 3/2007 | Watts, Jr. |
| 7,228,448 | B2 | 6/2007 | Anderson et al. |
| 7,272,732 | B2 | 9/2007 | Farkas et al. |
| 7,295,949 | B2 | 11/2007 | Vorenkamp et al. |
| 7,353,133 | B2 | 4/2008 | Park |
| 7,383,451 | B2 | 6/2008 | Matsushima et al. |
| 7,421,598 | B2 | 9/2008 | Brittain et al. |
| 7,421,601 | B2 | 9/2008 | Bose et al. |
| 7,451,332 | B2 | 11/2008 | Culbert et al. |
| 7,562,234 | B2 | 7/2009 | Conroy et al. |
| 7,640,760 | B2 | 1/2010 | Bash et al. |
| 7,788,516 | B2 | 8/2010 | Conroy et al. |
| 8,332,679 | B2 | 12/2012 | Conroy et al. |
| 2001/0021217 | A1 | 9/2001 | Gunther et al. |
| 2002/0007463 | A1 | 1/2002 | Fung |
| 2002/0020755 | A1 | 2/2002 | Matsushita |
| 2002/0065049 | A1 | 5/2002 | Chauvel et al. |
| 2002/0083354 | A1 | 6/2002 | Adachi |
| 2002/0099962 | A1 | 7/2002 | Nakamura |
| 2002/0143488 | A1 | 10/2002 | Cooper et al. |
| 2002/0149911 | A1 | 10/2002 | Bishop et al. |
| 2002/0194509 | A1 | 12/2002 | Plante et al. |
| 2003/0053293 | A1 | 3/2003 | Beitelmal et al. |
| 2003/0126475 | A1 | 7/2003 | Bodas |
| 2003/0188210 | A1 | 10/2003 | Nakazato |
| 2004/0003301 | A1 | 1/2004 | Nguyen |
| 2004/0003303 | A1 | 1/2004 | Oehler et al. |
| 2004/0044914 | A1 | 3/2004 | Gedeon |
| 2004/0064745 | A1 | 4/2004 | Kadambi |
| 2004/0088590 | A1 | 5/2004 | Lee et al. |
| 2004/0117680 | A1 | 6/2004 | Naffziger |
| 2004/0133816 | A1 | 7/2004 | Miyairi |
| 2004/0148258 | A1 | 7/2004 | Silvester |
| 2004/0159240 | A1 | 8/2004 | Lyall |
| 2004/0163001 | A1 | 8/2004 | Bodas |
| 2004/0181698 | A1 | 9/2004 | Williams |
| 2004/0210787 | A1 | 10/2004 | Cox et al. |
| 2005/0015764 | A1 | 1/2005 | Gaur |
| 2005/0055590 | A1 | 3/2005 | Farkas et al. |
| 2005/0102539 | A1 | 5/2005 | Hepner et al. |
| 2005/0132371 | A1 | 6/2005 | Lopez-Estrada |
| 2005/0136989 | A1 | 6/2005 | Dove |
| 2005/0138440 | A1 | 6/2005 | Barr et al. |
| 2005/0143865 | A1 | 6/2005 | Gardner |
| 2005/0149540 | A1 | 7/2005 | Chan et al. |
| 2005/0182986 | A1 | 8/2005 | Anderson et al. |
| 2005/0210304 | A1 | 9/2005 | Hartung et al. |
| 2005/0240786 | A1 | 10/2005 | Ranganathan |
| 2005/0273208 | A1* | 12/2005 | Yazawa .................. G01K 7/425 700/299 |
| 2005/0278556 | A1 | 12/2005 | Smith et al. |
| 2005/0283683 | A1 | 12/2005 | Abedi et al. |
| 2006/0005057 | A1 | 1/2006 | Nalawadi et al. |
| 2006/0036878 | A1 | 2/2006 | Rothman et al. |
| 2006/0047983 | A1 | 3/2006 | Aleyraz et al. |
| 2006/0098463 | A1 | 5/2006 | Baurle et al. |
| 2006/0137377 | A1 | 6/2006 | Samson et al. |
| 2006/0168456 | A1 | 7/2006 | Chaudhry et al. |
| 2006/0190745 | A1 | 8/2006 | Matsushima et al. |
| 2006/0190749 | A1 | 8/2006 | He et al. |
| 2006/0248354 | A1 | 11/2006 | Pineda De Gyvez et al. |
| 2006/0288241 | A1 | 12/2006 | Felter et al. |
| 2006/0294400 | A1 | 12/2006 | Diefenbaugh et al. |
| 2007/0016706 | A1 | 1/2007 | Arnold et al. |
| 2007/0050644 | A1 | 3/2007 | Merkin |
| 2007/0067136 | A1 | 3/2007 | Conroy et al. |
| 2007/0083779 | A1 | 4/2007 | Misaka et al. |
| 2008/0276111 | A1 | 11/2008 | Jacoby et al. |
| 2010/0040085 | A1 | 2/2010 | Olderdissen et al. |
| 2010/0115293 | A1 | 5/2010 | Rotem et al. |
| 2011/0001358 | A1 | 1/2011 | Conroy et al. |
| 2011/0154064 | A1 | 6/2011 | Niekrewicz et al. |

FOREIGN PATENT DOCUMENTS

| | | |
|---|---|---|
| JP | 2002-163038 | 6/2002 |
| JP | 2002-175131 | 6/2002 |
| JP | 2003-514296 A | 4/2003 |
| JP | 2003-295986 | 10/2003 |
| JP | 2005-071364 A | 3/2005 |
| WO | WO 99/17184 | 4/1999 |
| WO | WO 01/35200 | 5/2001 |
| WO | WO 03/060678 A2 | 7/2003 |
| WO | WO 2006/019973 A1 | 2/2006 |
| WO | WO 2007/024403 A2 | 3/2007 |

OTHER PUBLICATIONS

PCT International Preliminary Report on Patentability Report on Patentability and Written Opinion for PCT Int'l. Application No. PCT/US2006/029244, mailed Mar. 6, 2008, (14 pages) (not yet cited in 1449).

PCT International Search Report and Written Opinion for PCT Int'l. Application No. PCT/US2006/029244, mailed Sep. 17, 2007, (22 pages).

(56) References Cited

OTHER PUBLICATIONS

PCT International Search Report and Written Opinion for PCT Int'l. Application No. PCT/US2008/013975 mailed Mar. 17, 2009, (13 pages).
PCT Search Report and Written Opinion for PCT Int'l. Application No. PCT/US2006/029049, mailed Mar. 6, 2008, (10 pages).
Hashimoto, "Clock-up, Silencing of the machine . . . "Get 120% performance Free-of-charge tune of the motherboard by software, DOS/V Power Report, vol. 14, No. 6, Japan, Impress Corporation, vol. 14, p. 7.3 (1 page).
PCT International Search Report and Written Opinion for PCT Int'l. Application No. US2008/014036, mailed Jul. 22, 2010, (14 pages).

\* cited by examiner

Balanced load profile K1 (e.g., 0.5, 0.5)

2100

| Settings | CPU | GPU | Allocated Power |
|---|---|---|---|
| Setting 1 | A1 (e.g., 10) | B1 (e.g., 10) | P1 (e.g., 20) |
| Setting 2 | A2 (e.g., 7) | B2 (e.g., 7) | P2 (e.g., 14) |
| Setting 3 | A3 (e.g., 5) | B3 (e.g., 5) | P3 (e.g., 10) |

Fig. 21 A

CPU-heavy load profile K2 (e.g., 0.75, 0.25)

2110

| Settings | CPU | GPU | Allocated Power |
|---|---|---|---|
| Setting 1 | A1 (e.g., 15) | B1 (e.g., 5) | P1 (e.g., 20) |
| Setting 2 | A2 (e.g., 10) | B2 (e.g., 4) | P2 (e.g., 14) |
| Setting 3 | A3 (e.g., 7) | B3 (e.g., 3) | P3 (e.g., 10) |

Fig. 21 B

GPU-heavy load profile K3 (e.g., 0.25, 0.75)

2120

| Settings | CPU | GPU | Allocated Power |
|---|---|---|---|
| Setting 1 | A1 (e.g., 5) | B1 (e.g., 15) | P1 (e.g., 20) |
| Setting 2 | A2 (e.g., 3.5) | B2 (e.g., 10) | P2 (e.g., 14) |
| Setting 3 | A3 (e.g., 3) | B3 (e.g., 7) | P3 (e.g., 10) |

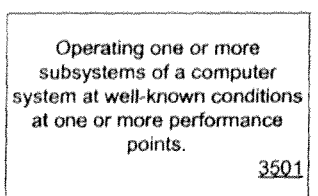
Operating one or more subsystems of a computer system at well-known conditions at one or more performance points.
3501

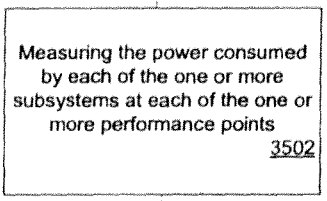
Measuring the power consumed by each of the one or more subsystems at each of the one or more performance points
3502

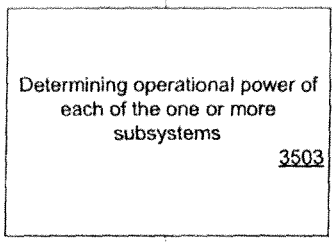
Determining operational power of each of the one or more subsystems
3503

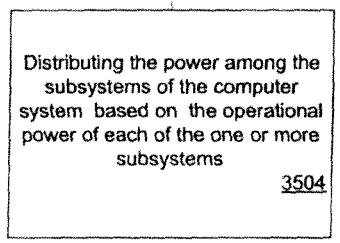
Distributing the power among the subsystems of the computer system based on the operational power of each of the one or more subsystems
3504

FIG. 35

METHODS AND APPARATUSES FOR DYNAMIC POWER CONTROL

RELATED APPLICATIONS

The present application is a divisional of U.S. patent application Ser. No. 11/327,685, filed on Jan. 5, 2006, which is a continuation-in-part of U.S. patent application Ser. No. 11/212,970, filed on Aug. 25, 2005, now issued as U.S. Pat. No. 7,562,234.

TECHNOLOGY FIELD

At least some embodiments of the present invention relate generally to data processing systems, and more particularly but not exclusively to the management of power usage in data processing systems.

BACKGROUND

Traditionally, computer systems are designed to be able to continuously run a fairly worst-case power load. Design according to such a continuous worst-case power load has never been much of a problem, because traditionally the individual components have had modest operating powers and the computer systems have had large power budgets so that the systems could sustain the load fairly naturally.

As the operating power consumptions of the individual components of computer system creep upwards, the power budgets of the computer systems have become tighter. It is now becoming a challenge to design a computer system to run a continuous worst-case workload while pursuing other high performance goals, such as high computing power, compactness, quietness, better battery performance, etc. For example, portable computer systems, such as laptop computers, have a limited battery output capability; and thus a worst-case workload for a given battery output capability may limit the performance of the system because the worst case workload may rarely occur.

Currently, computer systems do not provide an adequate feedback that critical system thresholds are encountered, such as thresholds beyond which the system cannot operate. As a result, the process of designing a computer includes the addition of operating margins to ensure that the critical thresholds are not exceeded during normal system operation. For example, operating a computer system for a worst case workload requires large operational margins that may impact performance of the computer system. Typically, the setting of operating margins is based on a fixed threshold temperature of a die. The temperature of the die is monitored by a sensor placed on the die. When the temperature of the die reaches a specified threshold temperature, the die is automatically turned off, or slowed down.

Additionally, operating the computer system without adequate feedback may require a cooling system to operate at a maximum effort, thereby generating considerable noise if the cooling system includes conventional cooling fans. For example, the cooling system driven by the temperature of the die may continuously need to operate at the maximum effort to guarantee that the die temperature does not exceed a specified threshold temperature. Operating the computing system with the cooling system at the maximum effort results in more power consumption and may generate a lot of noise.

SUMMARY OF THE DESCRIPTION

Exemplary embodiments of methods and apparatuses to provide a thermal control arrangement for a data processing system are described. The thermal control arrangement uses a component-specific feedback associated with temperature control in computer chips to statically and dynamically set target temperatures for a heat sink of the computer system. The computer system may include a component e.g., a die, and/or a chip that may include a microprocessor, a memory, or both, coupled to a heat sink. The computer system may be portable or may be a small desktop computer system. In one embodiment, the computer system includes a cooling unit, e.g., a fan, coupled to the heat sink.

In one embodiment, a signal associated with a temperature control of a component is received. The signal is asserted when a temperature of the component exceeds a component-specific threshold value. Typically, the threshold temperature of the component is defined as a temperature above which the component may fail. For example, the signal associated with the temperature control of the component may be a single bit signal which is asserted when the temperature in the component or immediately surrounding the component exceeds the threshold temperature. In one embodiment, the signal may be a low-true signal PROCHOT# (hereinafter PROCHOT #_L) pin asserted in a microprocessor, as produced e.g., by Intel Corporation, located in Santa Clara, Calif. Typically, when the temperature of the component exceeds the threshold value, the thermal throttles are engaged to automatically lower a frequency of the component to avoid failure of the component. Next, a target temperature of the heat sink is adjusted based on the signal associated with the temperature control of the component. For example, the target temperature of the heat sink may be adjusted depending on a duration of the asserted signal. For example, the target temperature of the heat sink may be decreased if the signal is asserted longer than a predetermined fraction of time over a predetermined time interval. The target temperature of the heat sink may be increased if the signal is asserted for shorter than a predetermined fraction of time over a predetermined time interval. Adjusting the target temperature of the heat sink based on the asserted signal is performed to keep the heat sink temperature just below a level that is associated with the threshold temperature of the component to avoid automatic lowering a frequency of the component. Adjusting the target temperature of the heat sink based on the asserted signal increases efficiency of the computer system while potentially decreasing cooling of the computer system.

In one embodiment, a temperature control loop of a heat sink coupled to a component, e.g., a microprocessor, is operated. For example, one or more sensors may be placed on the heat sink to monitor the temperature of the heat sink. A signal associated with a temperature control of the component is asserted. Next, a target temperature of the heat sink to operate the temperature control loop of the heat sink is adjusted based on the asserted signal. Further, an operation of the component, a cooling unit coupled to the heat sink, or both, may be adjusted based on a relationship between a monitored temperature of the heat sink and an adjusted target temperature of the heat sink. For example, the operation of the component may be adjusted by changing an operation frequency of the component, a voltage setting, or both. The operation of the cooling unit may be adjusted, e.g., by changing a speed of a fan.

In another embodiment, a temperature of the heat sink is increased until the signal associated with the temperature control of the component is asserted. The temperature of the heat sink may be measured by one or more sensors placed on the heat sink. A difference between a measured temperature of the heat sink and a maximum temperature of the component is determined. A baseline for efficient system operational point, e.g., a baseline target temperature of the heat sink, and tolerance parameters for an assembly including the heat sink and the cooling unit in the computer system, may be set based on the difference between the measured temperature and the maximum temperature of the component.

In one embodiment, a computer system includes a component, e.g., a microprocessor chip, a memory chip, or any other integrated circuit chip, and a cooling system that includes, e.g., a heat sink. In one embodiment, the component is coupled to the heat sink. Heat from the component is transferred to the heat sink as part of a natural cooling process which is used to cool the component. In one embodiment, a cooling unit, e.g., a fan, is coupled to the heat sink. In one embodiment, the cooling system includes one or more sensors to measure the temperature of the computer system. For example, the one or more sensors may be placed on the heat sink. The computer system includes a power manager, e.g., a microcontroller, coupled to control the component, cooling system, and one or more sensors. The power manager receives a signal, e.g. a low-true signal PROCHOT# ("PROCHOT #_L") associated with a temperature control of the component. The power manager adjusts a target temperature of the cooling system based on the signal. In one embodiment, the one or more sensors are located on a side of a heat sink opposite to the location of the component. For example, the one or more sensors are located on a backside of the heat sink, and the component is located on a front side of the heat sink. In one embodiment, the power manager operates a temperature control loop of the heat sink and this temperature control loop is adjusted based on the assertion (and/or non-assertion) of the signal. A parameter which may be used within this temperature control loop is a target temperature of the heat sink and the power manager operates the temperature control loop to maintain the heat sink at or below this target temperature. The target temperature may be adjusted by the power manager based on the assertion or non-assertion of the signal, such as the PROCHOT_L, signal. For example, the power manager determines the temperature of the heat sink and adjusts the operation of the component, and the cooling unit, to control the temperature of the heat sink. In one embodiment, the power manager provides a diagnostics that determines a difference between a measured temperature of the heat sink and a maximum temperature of the component to set a baseline for an efficient system operational point, and to set tolerance parameters for an assembly that includes a heat sink and a cooling unit. In one embodiment, the power manager statically and dynamically adjusts a target temperature of the heat sink, such that the target temperature is kept below the threshold temperature of the component to avoid automatic lowering of the frequency of the component.

BRIEF DESCRIPTION OF THE DRAWINGS

The present invention is illustrated by way of example and not limitation in the figures of the accompanying drawings in which like references indicate similar elements.

FIGS. 21A-21C illustrate one embodiment of power distribution tables built for a system that includes a CPU and a GPU subsystems.

FIG. 35 is a flowchart of another embodiment of a method of using intermediate operational power points to distribute power in a computer system.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

In one embodiment of the present invention, it is recognized that power consumptions in a computer system typically change frequently during typical usages. Typically, not all components are simultaneously in the maximum power consumption mode. Further, some components may not be in the maximum power consumption mode continuously for a long period of time. The power consumption of a component, such as the central processing unit (CPU) microprocessor, changes dramatically over time in typical usages. For example, in the prior art, the power supplies or a battery pack of computer system were designed to produce enough power to satisfy a worst case scenario in which all of the components of the computer system were drawing their maximum (in this case, worst level) amount of power. This worst case scenario essentially adds together the worst case, maximum level, power consumption; and the design takes this scenario into account when selecting a power supply or a battery pack. Thus, designing a computer system to sustain the worst-case load can be overly conservative for typical usages.

In one embodiment of the present invention, a computer system is designed to optimize various design goals for typical usages. However, worst-case load cases can occur. To avoid damage to the computer system, a dynamic power management system is used to dynamically budget the power usage of at least some of the components of the computer system such that, when the heavy asks are imposed on the system, the system can trade performance for power consumption to stay within the power usage limit.

Figure 1:
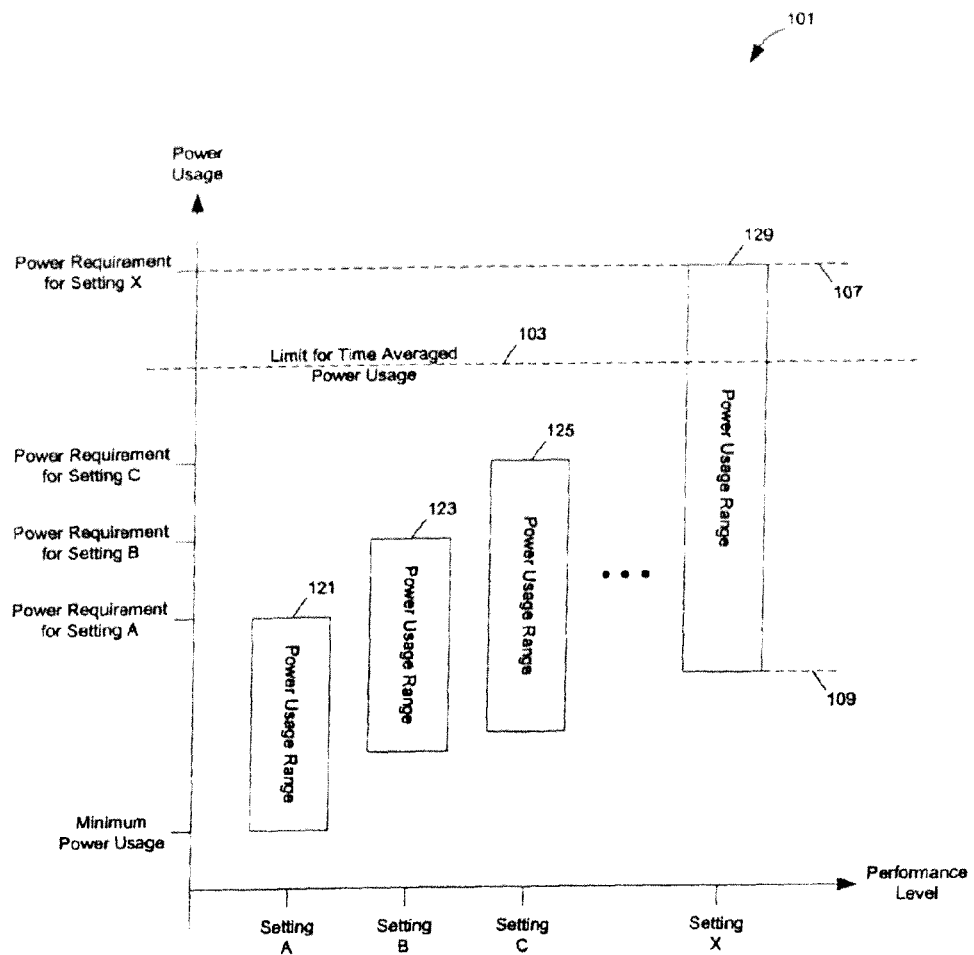
FIG. 1 illustrates a method to dynamically control power usage according to one embodiment of the present invention.

FIG. 1 illustrates a method to dynamically control power usage according to one embodiment of the present invention.

In FIG. 1, a computer system has a number of different throttle settings. For example, the CPU processor of the computer system may be set to run under different core voltages and/or different core frequencies such that the system can be fully functional but at different performance levels to trade power usage and computing performance.

Typically, different throttle settings correspond to different performance levels. Further, different settings have different power requirements (e.g., 121, 123, 125, . . . , 129).

The power requirement at each setting is the maximum possible power usage at the corresponding setting. However, depending on the tasks being performed, the actual power consumptions can vary within a range.

For example, at setting X, the power usage range (129) is between the minimum possible power consumption (109) (e.g., when the system is in idle) and the maximum power consumption (107) (e.g., when the system is fully busy).

In one embodiment of the present invention, the system is so designed that the limit (103) for time averaged power usage is less than the power requirement (107) for setting X. Thus, if the system were allowed to be fully busy for a long period of time, the system might be damaged. However, it is recognized that in a typical usage the average of the dynamic power usage range (129) may be lower than the limit (103) so that the system can be in the setting X for a long period of tune for high performance.

In one embodiment of the present invention, when the system receives a task that requires the system to be fully busy for a long period of time, the system automatically switches to a different setting (e.g., setting C) such that the limit (103) is not violated.

One embodiment of the present invention dynamically budgets the power usage for components of a data processing system, which may have a power usage constraint, such as thin-and-light portables computers, or larger portables, and/or small consumer desktops. For example, the constraint of heat dissipation on a computer system with a compact housing may limit the power usage. For example, to maintain the performance of a battery pack, there is a limit on average battery discharge current. Although the battery may allow a much higher instantaneous discharge current, the battery may have a much lower limit on average discharge current for a period of time to prevent significantly degrading the performance of the battery, or causing irreversible damage to the battery.

In one embodiment of the present invention, computer systems (e.g., portable computers or desktop computers) are designed for typical usages and may not sustain a continuous worst-case power load for a long period of time. Typically, a burst of computer tasks may require an instantaneous peak power load, which lasts only for a short period of time before the tasks are completed. Before and after the burst of the tasks, the computer system typically consumes a power load that is much lower than the worst-case power load. Since certain power usage limits are not based on the instantaneous power usage (e.g., the power limits based on thermal/heat dissipation constraint, based sustainable battery discharge current, etc.), such a temporary burst of tasks may be tolerable to allow high performance under tight power budget for typically usages.

Thus, with at least certain embodiments of the invention, performance levels (and power consumption levels) are set, for a short period of time (e.g., burst activity periods), to exceed a continuous state power capacity of the system (e.g., a power supply, or a battery pack). Traditionally, a computer system is designed according to the continuous worst-case workload; thus, no power usage range is allowed to exceed a limit for maximum continuous usage of a power supply (e.g., the capacity of a power supply to sustain a continuous state of constant power usage). For example, in a traditional design, no power usage range would exceed the limit (103), since the worst-case workload is traditionally treated as a continuous constant load. In one embodiment of the present invention, one or more power usage ranges (e.g., 129) is allowed to exceed the limit (103) for a limited continuous period of time. In one embodiment of the present invention, the power usage of the system is managed such that the actual power usage is in average (e.g., over a time window based on a time constant of the power suppler) below the limit (103).

Although the power stack-ups which happen under worst-case power load can happen, they rarely do happen. Far more often one encounters a situation where some parts of the computer system are operating at full power, and other parts of the system are operating at low power. For example, when one is performing a scientific computation, the processor and the memory are very busy and are consuming close to full power, but the optical disk drive is empty and is consuming close to no power. When one is playing a DVD, the optical disk drive is consuming close to full power because it is reading the DVD, and the display is also consuming close to full power because it is very bright, but the processor and memory are consuming only modest power because decoding a DVD is not a very demanding application.

In one embodiment of the present invention, the power of a computer system is redistributed and throttled dynamically to ensure that the actual power usage is within the power usage constraints.

In one embodiment of the present invention, dynamic power redistribution is used to design a computer system for a typical power load over some averaging interval, as opposed to designing it for a continuous worst-case power load. Because a typical power load, in an average sense, is less than a worst-case power load, the system designed in this way can be constructed from higher-power components (which may be cheaper, or may have higher performance), or can be made physically smaller.

Because worst-case power stack-ups rarely do happen, a system designed in this fashion performs as well as a system designed in the traditional way in all but the most pathological situations. Unfortunately, worst-case power stack-ups can happen. Since a system designed for typical power cannot naturally handle worst-case conditions, one embodiment of the present invention uses throttling to ensure that the power constraints are not violated.

For example, in FIG. 1, the system dynamically determine the "best" allowable setting according to the actual past power usage information to ensure that even if the computer is fully busy in the next time interval at the selected setting, the limit (103) will not be violated.

In one embodiment of the present invention, the system implements controls (throttles) on a subset of its subsystems which limit the maximum power that could be consumed by those subsystems. Adjusting the throttle settings can adjust the maximum power a subsystem (component) can use. Typically, these throttles limit the performance of the subsystem. For example, different throttle settings may be designed for different performance levels of the subsystem; and the power usage is limited as a side effect.

For example, the CPU (central processing unit) microprocessor may work using different core voltages and core frequencies. Using a high core voltage and a high frequency, the microprocessor can be optimized for computational performance but it has high power consumption. Using a low core voltage and a low frequency, the microprocessor can be optimized for battery performance at a degraded computational performance level.

In one embodiment, the microprocessor can shift from one core voltage level to another and from one frequency to another through slowly changing the voltage and through slowly change the frequency, without stopping or pausing the computational tasks of the processor. Typically, the voltage and the frequency are changed separately. For example, to move from a high frequency and a high core voltage to a low frequency and a low core voltage, the system changes the frequency while at the high voltage and then changes the voltage while at the low frequency. For example, to move from a low frequency and a low core voltage to a high frequency and a high core voltage, the system changes the voltage while at the low frequency and then changes the frequency while at the high voltage. Further details on changing CPU core voltage and frequency can be found in U.S. patent application Ser. No. 10/917,719, filed Aug. 12, 2004, which is hereby incorporated herein by reference.

In one embodiment of the present invention, the system dynamically redistributes power and sets these throttles so that even when the worst-case power load for these throttles occurs, the maximum power consumed over the averaging interval does not exceed the limit. Since worst-case power loads are rare, the throttle controls can normally be set to very high values, such that the system acts as if the limit does not exist when the demand of the system is lower than the dynamically determined budget.

Figure 2:
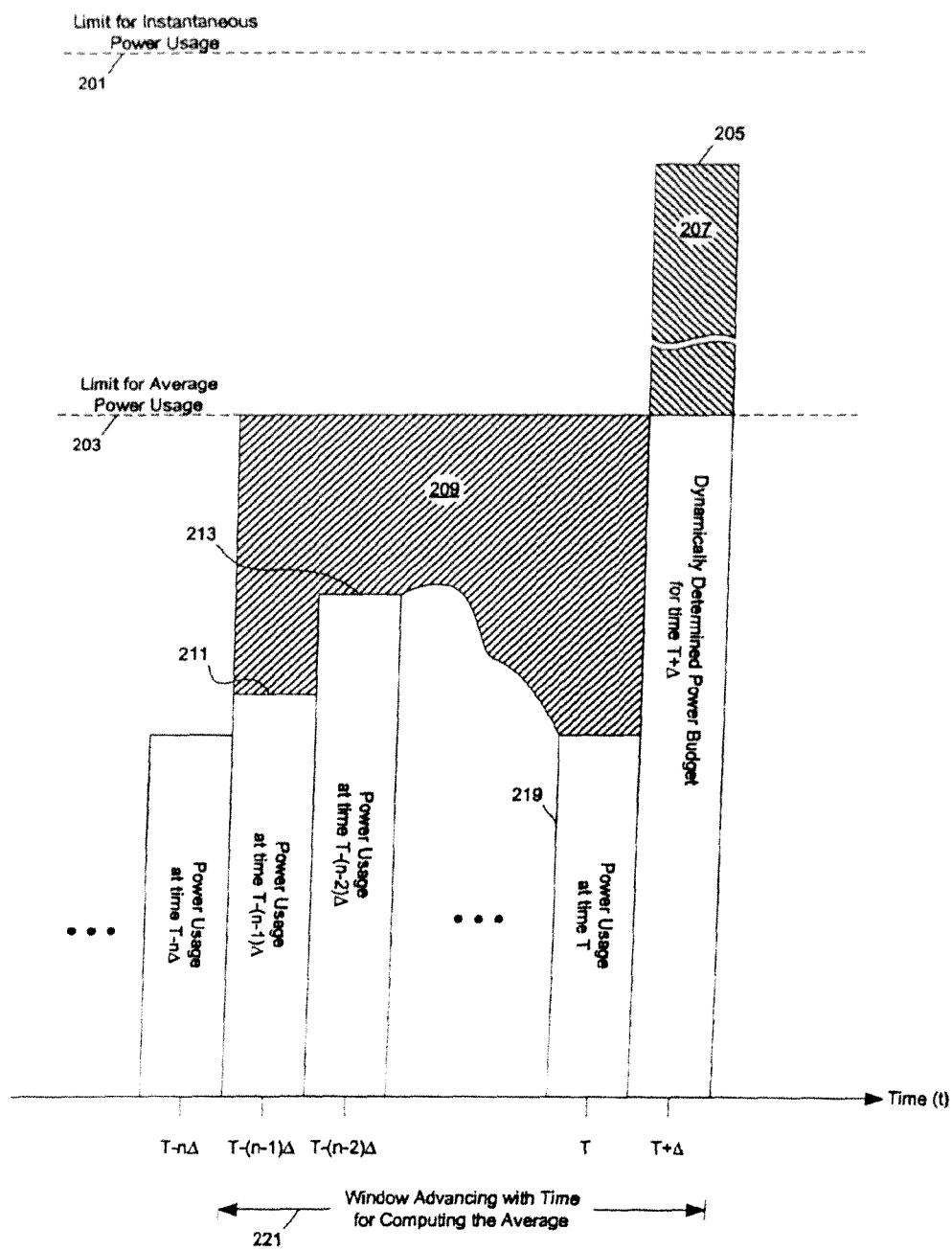
FIG. 2 illustrates a method to dynamically determine power usage budget according to one embodiment of the present invention.

FIG. 2 illustrates a method to dynamically determine power usage budget according to one embodiment of the present invention.

In FIG. 2, actual power usages are monitored. For example, the actual power usage can be measured periodically to determine the history of the power usage. The history of the power usage can be used to determine the power usage in certain averaged ways.

In one embodiment of the present invention, with the knowledge of the past power usage (e.g., measurements 211, 213, ..., 219 at times T−(n−1)Δ, T−(n−2)Δ, ..., T) the system can dynamically determine the allowable power budget for the next time interval (e.g., for time T+Δ).

For example, the limit (203) may be a simple average in a time window (221) of a time period (n+1)Δ (e.g., less than 10 seconds). Thus, in the example of FIG. 2, the actual past power usage (e.g., 211, 213, ..., 219) can be used to determine the power budget (205) such that the area (207) of the power budget that is above the limit (203) is equal to or less than the area (209) between the limit (203) for average power usage (203) and the curve of the past power usage.

The system is then throttled to a setting that will not require power usage more than the dynamically determined budget (205).

In the next time period (e.g., T+Δ), the actual power usage is measured, which is typically smaller than the power budget (205). Using the newly measured power usage information and the time window that advances with time for computing the average, the power budget and throttle setting for a further time period can be determined in a similar way.

In one embodiment, the power budget (205) is further limited according to other conditions, such as the limit (201) for instantaneous power usage.

Further, there may be a number of different types of average-based power usages (e.g., with different weight in averaging, based on different power limitation considerations, etc.) Thus, multiple copies of the power budget can be determined from a set of different computations, based on past power usage information; and the lowest power budget can be selected as the limiting budget that the determines the throttle setting.

In one embodiment, the measurement is an instantaneous data sample; and the frequency of the data samples are such that the changing history of the power usage is captured in a reasonably accurate way. Alternatively, the measurements may be obtained through an integration process such that even a small number of data samples can represent the power usage history with sufficient accuracy.

Note that the data samples may or may not be collected at the same time interval as that for computing the power budget and throttle setting. In one embodiment, the time period for determining the throttle setting is sufficiently short in comparison with the window (221) to allow flexibility in budgeting and long enough to provide sufficient time for the system to transit from one throttle setting to another when necessary and work reliably in the selected throttle setting.

The time period for determining the throttle setting may or may not be constant. For example, when a significant power usage event occurs (e.g., when the requirement estimate of the non-throttled components changes), the system may automatically start a new computation of the throttle setting.

Figure 3:
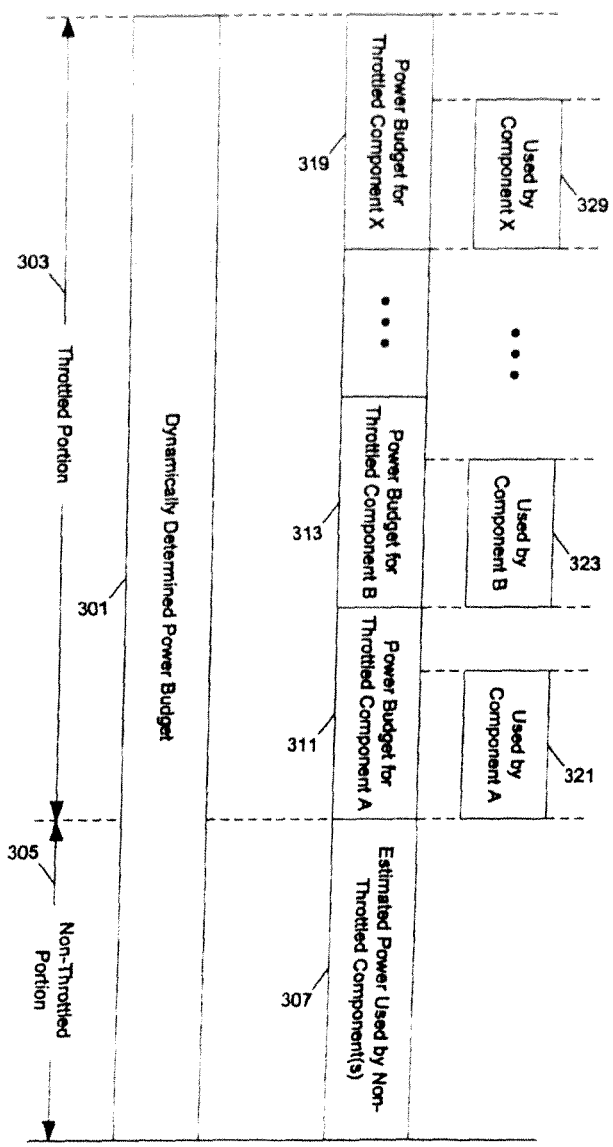
FIG. 3 illustrates a method to dynamically distribute power usage budget according to one embodiment of the present invention.

FIG. 3 illustrates a method to dynamically distribute power usage budget according to one embodiment of the present invention.

In FIG. 3, the dynamically determined power budget (301) is to be allocated to different components (subsystems) of the system.

In one embodiment, the system includes throttled component(s) and non-throttled component(s). A throttled component has different throttle settings at which the component is functional but at different power/performance levels (operating setting). For example, a processor may be throttled to work at different core voltages and core frequencies; a disk drive may be throttled to work at different spin rate; a bus may be throttled at different frequencies; etc. If a component is not throttled to trade performance for power usage, the component is considered a non-throttled component.

In FIG. 3, the power budget (301) includes a throttled portion (303) and a non-throttled portion (305). The non-throttled portion corresponds to the estimated power used by non-throttled component(s) (307). The throttled portion is determined from the difference between the dynamically determined power budget (301) and the estimated power used by the non-throttled component(s).

In general, there can be one or more throttled components. When there are multiple throttled components, the throttle settings determined for the throttled components are such that the sum of the maximum powers (e.g., 311, 313, ..., 319) that can be used by the corresponding throttled components is no more than the throttled portion of the budget. Thus, the maximum powers (e.g., 311, 313, ..., 319) that can be used by the corresponding throttled components can be considered as budgets for the throttled components; and the throttle settings ensure that the actual powers (e.g., 321, 323, ..., 329) used by the throttled components are no more than their dynamically determined budgets (e.g., 311, 313, ..., 319).

Typically, the components (subsystems) whose throttle is adjusted may not actually consume the entire amount of power that is budgeted, since these components may not be busy enough to run at the maximum power corresponding to the throttle setting. The adjustment of the throttle allows the subsystem the freedom to consume up to the worse case power load for the corresponding throttle setting without violating power constraints.

When a worst-case power load appears, the system quickly notices the need for dynamic power redistribution and sets the throttles to lower values, keeping the system within its operating limits. In general, the power redistribution may be in the form of redistributing among subsystems (components) and/or redistributing over the time for the same subsystem (component) among different performance levels.

Imagine a system with an empty DVD drive that is running a scientific application. The processor and memory subsystems of the system are consuming close to full power, making the whole system run close to its operating limits. Now imagine that a disk is loaded into the DVD drive, which means that the DVD drive is to be enabled, consuming considerable power. In order to actually have power to enable the DVD drive, the system adjusts its power budget so that some of the power which used to be allocated to the processor is now allocated to the DVD drive; the throttle associated with the processor is switched to a lower value.

In one embodiment of the present invention, the averaging interval is (relatively) long with respect to the rate at which the dynamic power redistribution is executed. The allows the system to notice that the system is close to exceeding its limits, and have time to adjust the throttles and ensure that the system does not actually exceed its limits. The typical parts of the system which have power limits (batteries, heat sinks) tend to have fairly long time constants. Thus, it is easy to select a rate at which the dynamic power redistribution is executed.

Although power is referred to as an example of embodiments of the presentation inventions, other parameters related to power can also be managed in a similar way. For example, battery discharge current can be managed in a similar way as power.

In one embodiment of the present invention, a system with dynamic power management according to embodiments of the present invention includes one or more components (subsystems) that can be throttled to have different power requirements at different performance levels and have one or more sensors to actually determine the power consumed.

In one embodiment of the present invention, the past history of actual power consumption is used to dynamically determine the power usage budget for the subsequent time interval, such that even if the worst-case load occurs in the subsequent time interval the power usage constraint (e.g., average power usage, or average battery discharge current) is not violated.

In one embodiment of the present invention, the actual power consumed by each subsystem is determined for the dynamic power redistribution and throttling.

In one embodiment of the present invention, instead of determining the actual power consumption by each subsystem, the sum of the power consumed by the throttled subsystems and the sum of the power consumed by the non-throttled subsystems are determined and used for the throttling.

Figure 4:
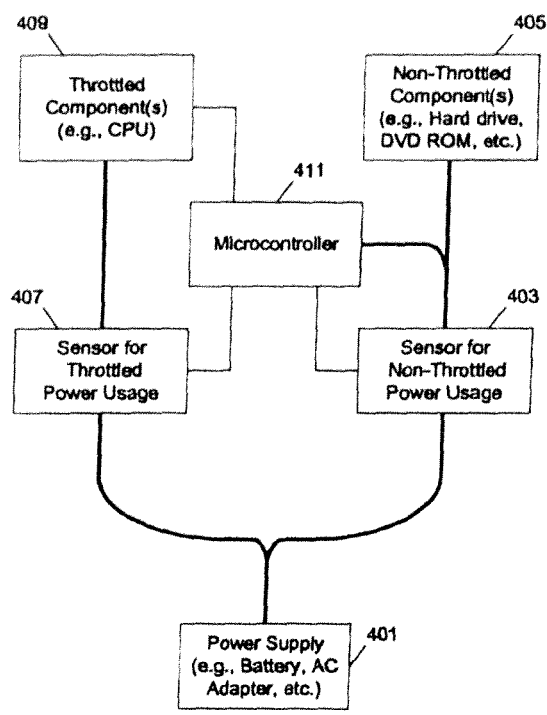
FIG. 4 illustrates a block diagram example of a system to dynamically control power usage according to one embodiment of the present invention.

FIG. 4 illustrates a block diagram example of a system to dynamically control power usage according to one embodiment of the present invention.

In FIG. 4, a microcontroller (411) is used to budget the power usage dynamically. The power supply (401) (e.g., battery, AC adapter, etc.) provides power to the throttled component(s) (409) (e.g., CPU) and the non-throttled component(s) (405) (e.g., hard drive, DVD ROM, etc.). The microcontroller (411) can be considered as part of the non-throttled components. Alternatively, the microcontroller (411) may draw power from a power supply different from the power supply (401). Sensors (407 and 403) are used to determine the actual power usages by the throttled component(s) (409) and the non-throttled component(s). The microcontroller (411) collects the actual power usage information from sensors (407 and 403) and communicates with throttled components (409) to make throttle changes.

In one embodiment, a single sensor or measuring device may be used to measure power drawn by several non-throttled devices (rather than having one sensor for each non-throttled device). For example, wires may be arranged to connect to several non-throttled devices; and the measured power is that consumed by all of the non-throttled devices connected. A sensor can be used to determine the sum of the power consumed by the system directly (e.g., using a single current sensor at a location where the current drawn by the throttled components and the current drawn by the non-throttled components merges) and to determine the dynamic throttle setting.

Alternatively, this approach may be implemented by, for example, coupling the single sensor to wires from each of the several non-throttled devices, and the measured currents and/or voltages are summed in the sensor. Alternatively, multiple sensors can be used; and the microcontroller (or the microprocessor) sums the measurements from the sensors.

For example, the microcontroller may store the determined throttle setting in a register and then send a signal to the corresponding component (or the main CPU) to enforce the throttle settling. In one embodiment, the microcontroller sends the signal to enforce the throttle change only when the dynamically determined throttle setting is different from the previous one.

In one embodiment, the sensors are implemented using hardware. Alternatively, at least some of the sensors can be implemented using software. For example, software modules may be used to determine the operation states and corresponding time periods to compute the actual power usage from predetermined power consumption rate for the operation states.

Figure 5:
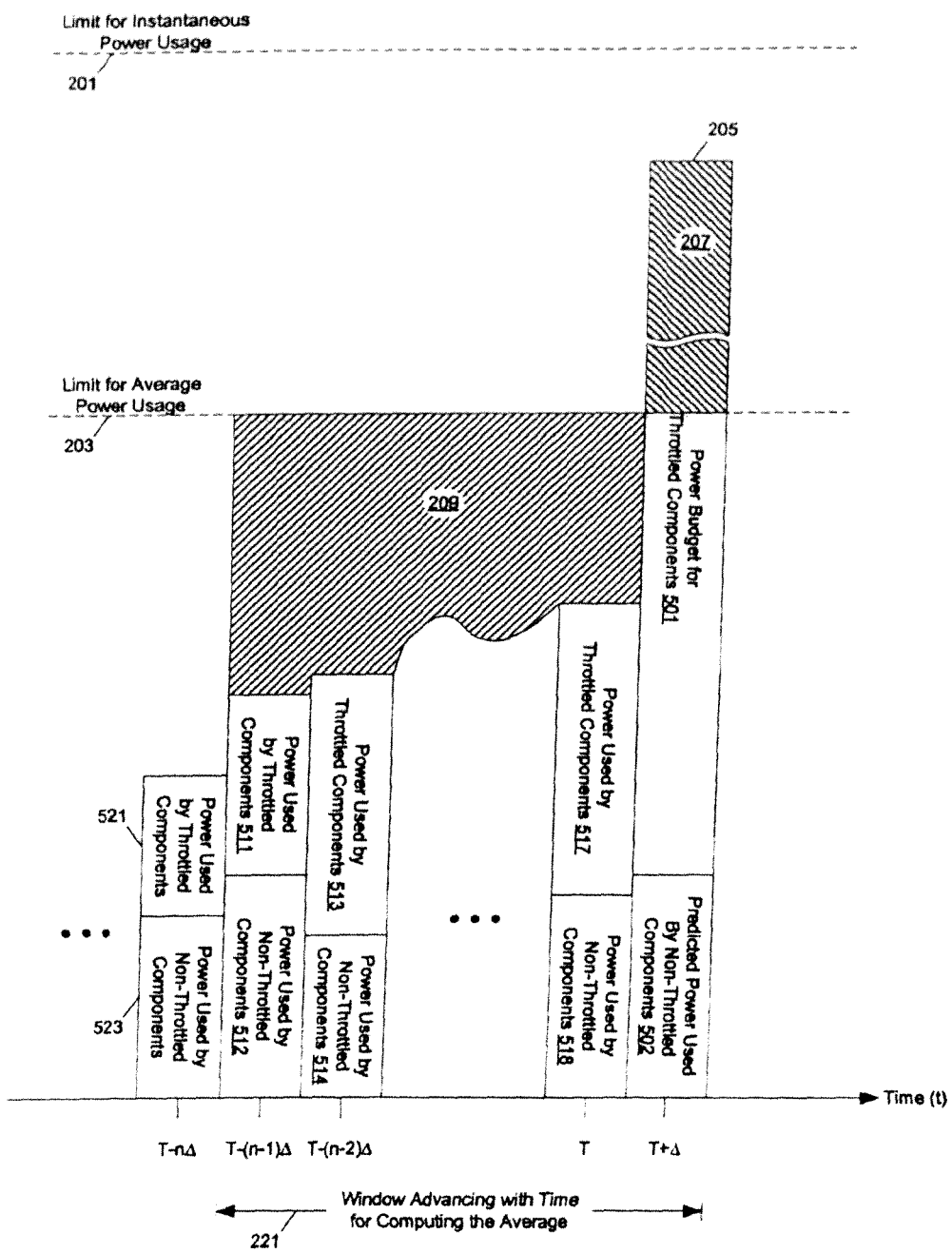
FIG. 5 illustrates an example of dynamically throttling components of a data processing system to control power usage according to one embodiment of the present invention.

FIG. 5 illustrates an example of dynamically throttling components of a data processing system to control power usage according to one embodiment of the present invention.

In FIG. 5, the actual power usages include the power used by the throttled components (e.g., 521, 511, 513, . . . 517) and the power used by the non-throttled components (e.g., 523, 512, 514, . . . 518).

In one embodiment, the power used by the non-throttled components at the subsequent time interval (e.g., T+Δ) is determined using the worst-case power load of the non-throttled component. Alternatively, the non-throttled components may be interrogated to obtain the worst-case power load of the non-throttled component according to their current operating status.

Alternatively, operating signals of at least some of the non-throttled components can be used to classify the corresponding non-throttled components into a global operating state, which is used to obtain an estimate that corresponds to the global operating state.

In one embodiment, the raw sensor measurements are used directly by a microcontroller or a microprocessor to perform dynamic power budgeting. Alternatively, the raw sensor measurements may be further processed using hardwire (e.g., using analog or digital circuitry) to generate data that is used by the microcontroller or microprocessor to perform dynamic power budgeting. Thus, there may be a layer of algebra between the raw sensors and the throttled and non-throttled powers.

In one embodiment, dynamic power redistribution is performed frequently and periodically. For example, the dynamically determined throttle setting can be determined periodically at a predetermined time interval. However, it is understood that the time interval is not necessarily a constant. For simplicity, some examples with a constant time interval are used to illustrate the methods according to embodiments of the present invention.

In one embodiment of the present invention, the setting for a throttle is computed for the next time interval to guarantee that the average power over the last N time intervals, including the next time interval, is less than a power constraint $P_{MAX}$. Thus, when the measured power data from the last N−1 time intervals is combined with the hypothetical worst-case power data of 1 sample or the next time interval, the average power is no more than $P_{MAX}$.

In general, the averaging process of the power usage over the last N time intervals can be a simple average, or a weighted average (e.g., weighted according to the elapsed time with decreasing weight for away back into the past), or other complex functions of the power usage history.

For example, let $P_T[N-1:1]$ be an array containing the measured power data of the throttled parts of the system for the last N−1 time interval. Let $P_N[N-1:1]$ be an array containing the measured power data of the non-throttled parts of the system. To determine the throttle for the next time interval:

1) update the array containing the measured power data of the throttled parts of the system. For example, $P_T[N-2:1]$ can be copied (e.g., through shifting) into $P_T[N-1:2]$; and a new measurement of the sum of the power data of the throttled part of the system is stored into $P_T[1]$. The oldest sample, which was in $P_T[N-1]$, is discarded.

2) similarly, update the array containing the measured power data of the non-throttled parts of the system. For example, $P_N[N-2:1]$ can be copied (e.g., through shifting) into $P_N[N-1:2]$; and a new measurement of the sum of the power data of the non-throttled part of the system is stored into $P_N[1]$. The oldest sample, which was in $P_N[N-1]$, is discarded.

3) compute $E_{PN}$, which is an estimate of average value of the non-throttled power over the last N samples, from the average of the N−1 power measurements in $P_N[N-1:1]$ and one estimate of the maximum power $P_N[0]$ which may be consumed by the non-throttled parts of the system.

4) for ith throttle setting, computer $E_{TN}[i]$, which is an estimate of the average value of the throttled power over the last N samples, from the average of the N−1 power measurements in $P_T[N-1:1]$ and the estimate of the maximum power $P_T[0, i]$ which may be consumed by the throttled parts of the system at throttle setting i.

5) determine the highest throttle setting $i_m$ for which $E_{PN} \square E_{TN}[i_m]$ is less than or equal to $P_{MAX}$. Thus, when throttle setting $i_m$ is used, the average power through the next time interval will be less than or equal to the maximum power allowed by the system.

Note that in general, any throttle setting $i_x$ for which $E_{PN} \Box E_{TN}[i_x]$ is less than or equal to $P_{MAX}$ can be selected without exceeding the limit $P_{MAX}$. In one embodiment, the throttle settings are arranged according to performance level. The higher the throttle setting, the higher the performance. Thus, the highest throttle setting that limit the power usage according to $P_{MAX}$ is selected to allow the highest performance under the power constraint.

Figure 6:
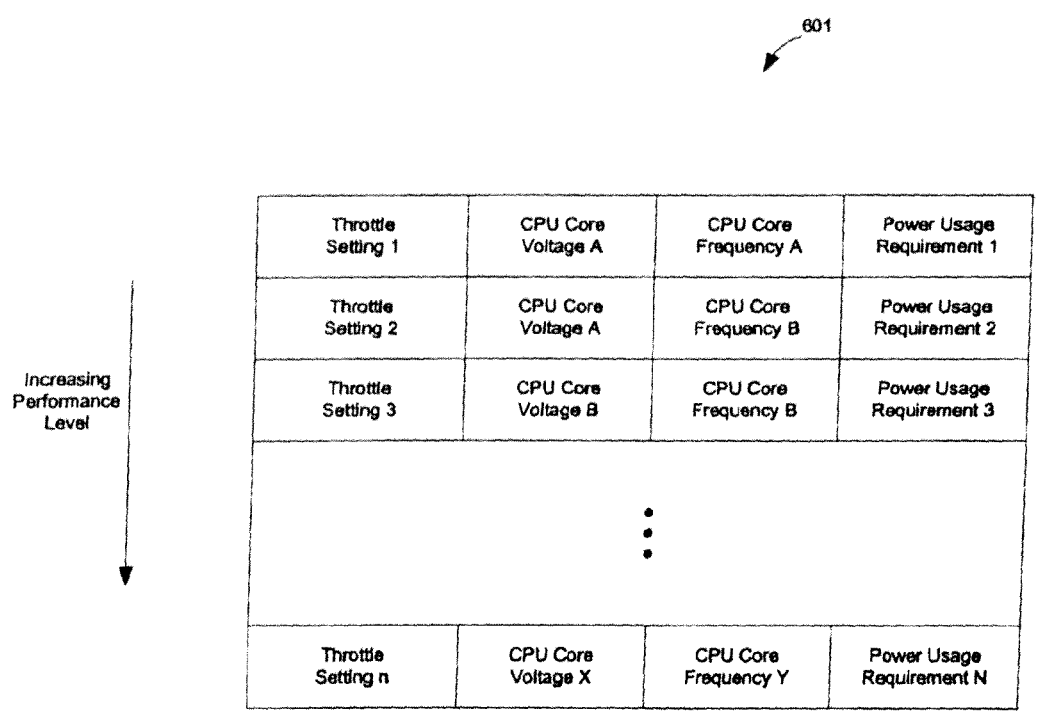
FIG. 6 illustrates an example of using throttle settings of a central processing unit (CPU) of a data processing system to control power usage according to one embodiment of the present invention.

FIG. 6 illustrates an example of using throttle settings of a central processing unit (CPU) of a data processing system to control power usage according to one embodiment of the present invention.

In FIG. 6, a number of different combinations of CPU core voltages and core frequencies are sorted so that the throttle setting increases with the performance level, as illustrated in table 601. In one embodiment, the system searches in the order of decreasing throttle setting to determine the first throttle setting that satisfies the relation $E_{PN} \Box E_{TN}[i_x] \leq P_{MAX}$.

Thus, when a throttle setting is determined, both the CPU core voltages and frequencies are determined.

Alternatively, the throttles may be sorted according to other goals (e.g., a combined goal indicator to reflect the requirement for high computing power and low energy consumption, etc.); and a "best" throttle setting can be searched in a similar way.

Note that if the are multiple independent throttles, a list of different combination of throttles can be examined to determine the allowable throttle settings. A "best" setting of the throttles can be selected according to certain rules that define the objective "best". It is understood that the rules for define the objective can be arbitrarily complex.

Figure 7:
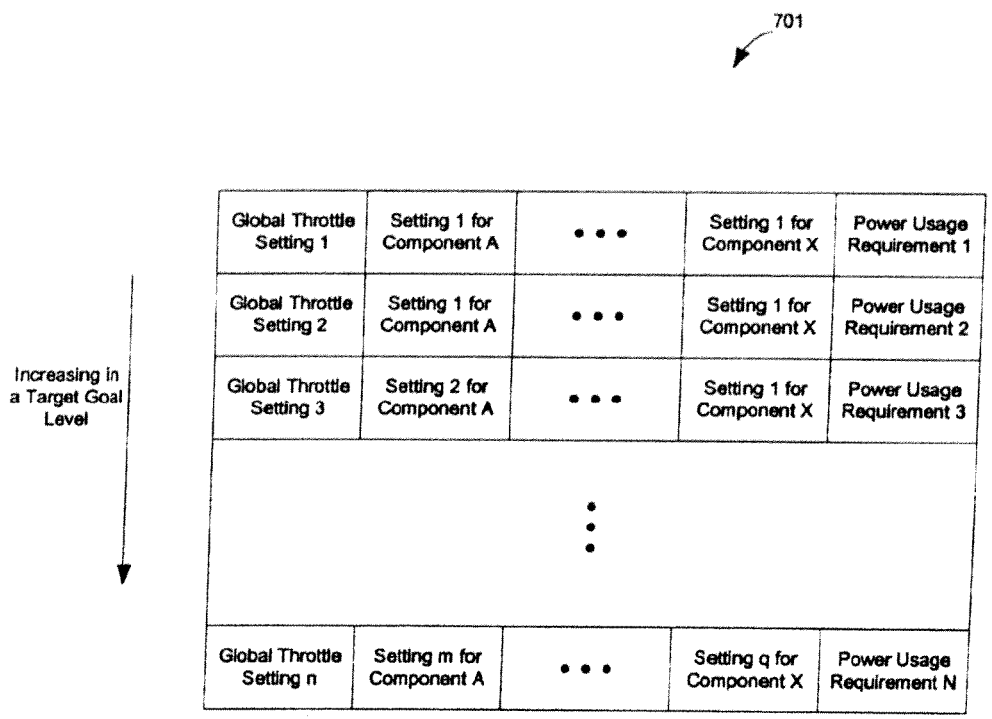
FIG. 7 illustrates an example of using throttle settings of multiple components of a data processing system to control power usage according to one embodiment of the present invention.

FIG. 7 illustrates an example of using throttle settings of multiple components of a data processing system to control power usage according to one embodiment of the present invention.

In FIG. 7, multiple components have independent throttle settings, as illustrated in table 701. To distribute the dynamically determined budget to the multiple components, different combinations of the throttle settings for the multiple components can be viewed as different global throttle settings. The global throttle settings can be sorted according to a target goal level.

In one embodiment, the sorting of the global settings can be performed at the design stage of the computer according to a static fixed target goal function, or manually arranged by the designer of the system.

Alternatively, the global settings can be performed in real time according to a target goal function, which may be a function of current state of the computer system. For example, some of the components may be busy so that require higher priority while others may be in idle and require lower priority. Thus, the target function can be constructed to include the consideration of the current workloads of the components. The workloads can be estimated from the history of the actual power consumptions. For example, the high power consumption with respect to the dynamic power range of the component indicates a high workload for the component.

Once the global settings are sorted according to the target goal level, the highest global setting that satisfies the power constraint is selected.

Figure 8:
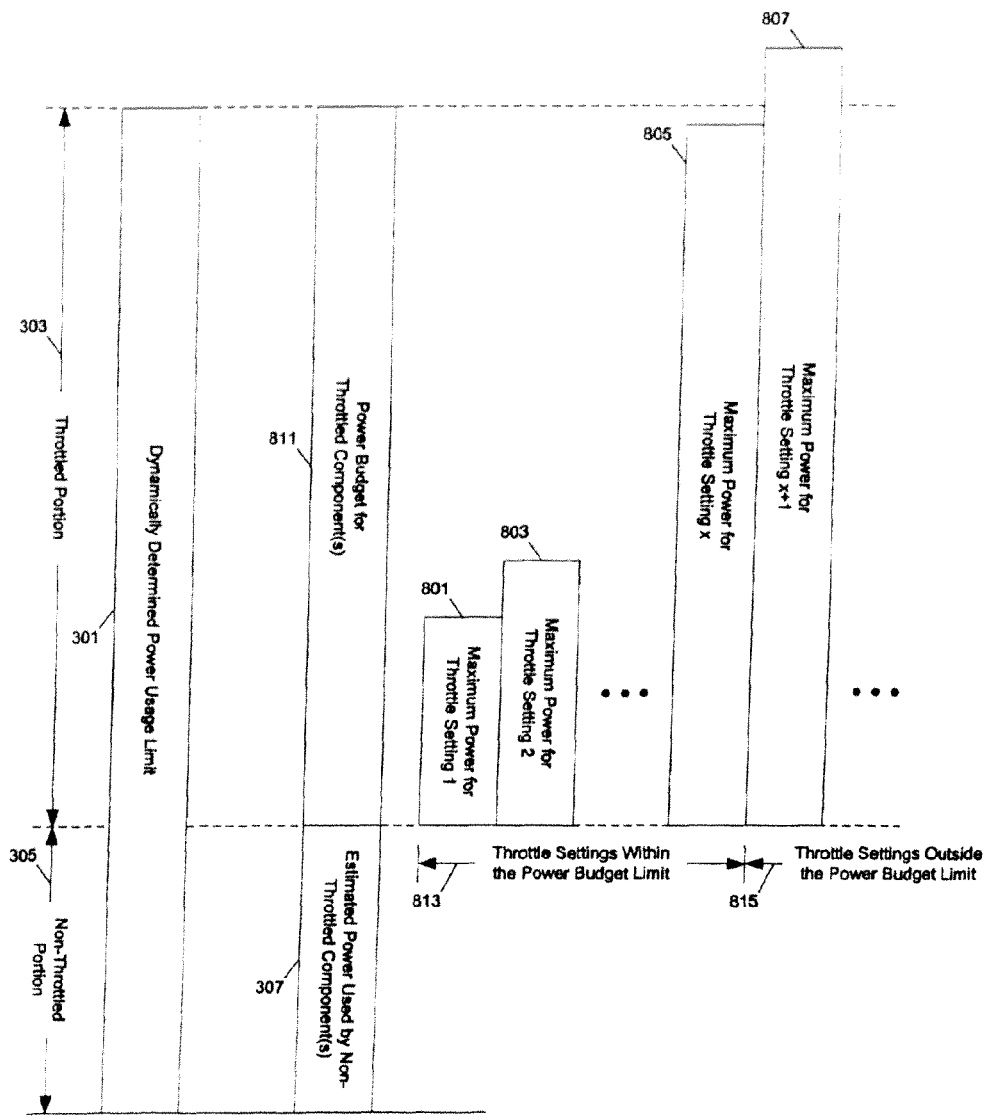
FIG. 8 shows a method to dynamically determine throttle setting according to one embodiment of the present invention.

FIG. 8 shows a method to dynamically determine throttle setting according to one embodiment of the present invention.

In FIG. 8, the throttle settings are sorted according to the power requirements. Since the power requirements are typically known at the design stage, the sorting can be performed once during the design of the system.

The dynamically determined power usage limit (301) is partitioned into the non-throttled portion (305) and the throttled portion (303). The non-throttled portion (305) corresponds to the estimated power (307) used by the non-throttled components in the subsequent time interval.

The power budget (811) for the throttled components can then be used to determine the set of throttle settings (813) that are within the power budget limit (e.g., 801, 803, . . . , 805). The throttle settings that are outside the power budget limit (815) will be excluded from consideration for the next time interval (e.g., 807).

The system then can select one from the allowable set of throttle settings (813) to optimize a performance goal.

In one embodiment, when the previous actual power usage is low, the power budget (811) for the throttled component(s) can be sufficient enough to allow all throttle settings.

Typically, a selected throttle setting is used until the power measurement for the next time interval is obtained and the next iteration of dynamic throttling is performed.

Alternatively, the throttle setting may be determined on a substantially continuous basis; and the power management system requests throttle setting changes when necessary. To avoid frequent changes in throttle settings, the power management system may determine the throttle setting so that the throttle setting will be valid for at least a predetermined period of time unless a significant change in the estimate of the power used by the non-throttled components is detected (e.g., when a disk is loaded into the DVD ROM drive).

In one embodiment of the present invention, the power management monitors the actual power usage and adjusts the throttling to avoid the violation of power constraints.

Figure 9:
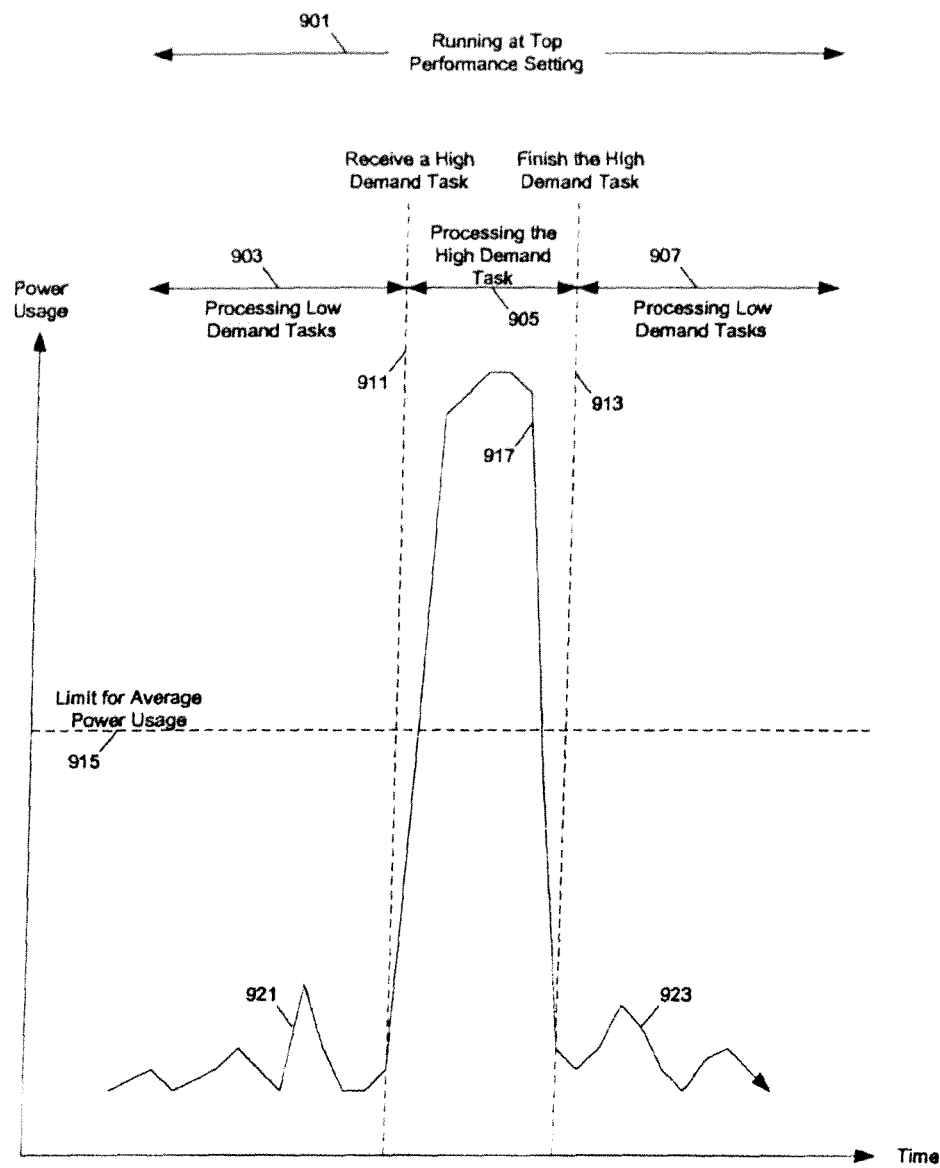
FIGS. 9-10 illustrate scenarios of power usage according to embodiments of the present invention.
Figure 10:
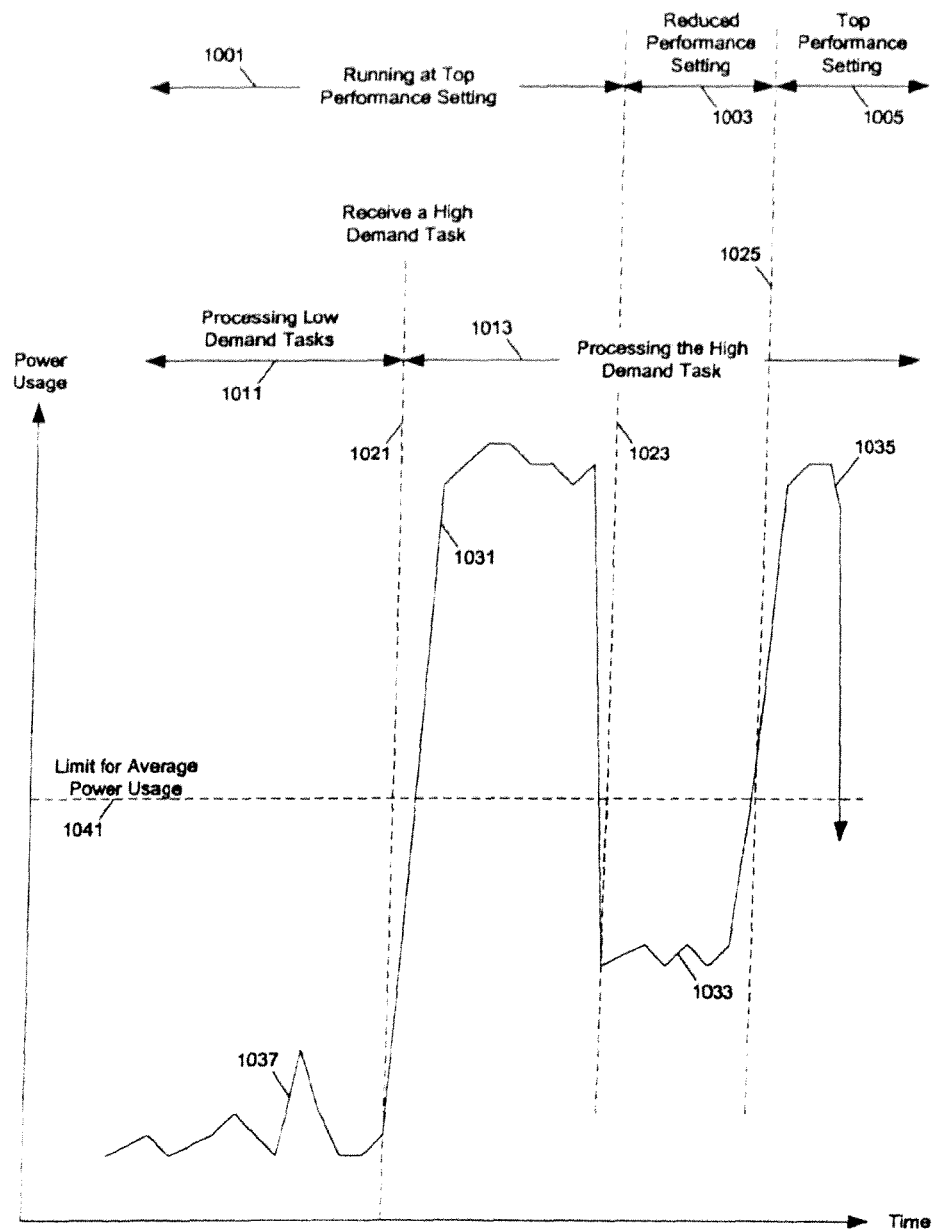

FIGS. 9-10 illustrate scenarios of power usage according to embodiments of the present invention.

In the scenario of FIG. 9, the computer system processes (903) low demand tasks before time instance (911); and the actual power (921) used by the system is below the limit (915) for average power usage. Since the power usage of the system is low, the system can be at the top performance setting (901).

After time instance (911), a high demand task is received. The system becomes busy in processing (905) the high demand task. Since the system had low power consumption before the reception of the high demand task, the power management allows the system to remain in the top performance setting for a short period of time. Thus, the actual power usage (917) increases to above the limit for average power usage. However, in average, the actual power usage is still below the limit.

After the high demand task is finished at time instance (913), the actual power usage (923) comes back to below the limit (915) for average power usage. Thus, the system can remain (901) in the top performance setting to process (907) low demand tasks.

The usage pattern as illustrated in FIG. 9 can be a typical one for certain usages of the system. Thus, the system can be designed on a tight power constraint while capable of running at top performance setting as if it were designed according to a worst-case load which would require a much higher power capacity.

However, the high demand task can be such that it may take a long period of time to finish the task. If the system were allowed to be in the top performance setting for a long period of time, the limit (915) for average power usage would be violated. A system according to embodiment of the present invention can automatically detect such situations and throttles accordingly to avoid exceeding the limit.

For example, in FIG. 10, before time instance (1021) of receiving a high demand task, the system processes (1011) low demand tasks, as indicated by the low actual power usage (1037).

After the time instance (1021), the system processes (1013) the high demand task for a period of time.

Initially, the system remains in the top performance setting, which causes the actual power usage to be above the limit (1041) for average power usage. At the time instance (1023), the power management recognizes that the average of the actual power usage in the past period is approaching the limit (1041); and the system throttles into a reduced performance setting (1003).

At the reduced performance setting, the actual power consumption (1033) is below the limit (1041) for average power usage. Thus, at time instance (1025), the average power usage in the past may fall below the limit (1041) enough to allow the system to temporary back to the top performance setting (1005).

When the processing of the high demand task lasts for a long period of time, the system automatically switches between the top performance setting and the reduced performance setting periodically to have a long term average that is close to the limit (1041) for the average power usage.

Thus, under the control of the dynamic throttling system, the system processes the high demand task as fast as possible within the limit of power constraint.

In one embodiment of the present invention, multiple copies of throttle settings can be determined based on different constraints, for example, one for each boundary condition of power. The lowest one of the multiple copies of throttle settings is then used to ensure that the all constraints are satisfied. Typically, the performance is set by the subsystem which is most constrained.

The estimate of the maximum power which may be consumed by the non-throttled subsystems can be computed by a simple worst-case analysis (adding together the maximum values which could happen under any conditions) or by a more elaborate analysis based on the information provided by the subsystems and detailed knowledge of the subsystem's state.

The dynamic throttle setting determination can be performed in a variety of components in the computer system, including the main processor of the computer system, or a microcontroller dedicated to the dynamic power throttling task.

There are advantages to execute the dynamic budgeting in the main processor, such as reduced cost, and the elimination of any need to communicate between the main processor and whatever other agent that is alternatively used to perform the task. However, it is difficult to make an arrangement such that dynamic power management operates in all situations, including when the software in the main processor fails or is replaced with some other software which has no knowledge of the power management algorithm. Further, when the computer system is in an otherwise idling state, the periodic power management task may prevent the system from entering a low power state, or may periodically wake the system from the low power state.

When the ability to load throttle settings is reserved to the main processor of the computer system and the dynamic power throttle determination is not performed in the main processor, making the computed throttle setting the current throttle setting may become complicated. The throttle settings need to be communicated to the main processor; and in some situations, it may be necessary to implement fail-safe mechanisms to deal with the (unlikely) case that the software running in the main processor ignores the command to load the throttles. The fail-safe mechanisms can be fairly crude, since they should only be engaged in emergency situations. For example, when the microcontroller determines that the average of the past N samples exceeds the power limit $P_{MAX}$ for a number of continuous time intervals, the microcontroller may assume that the throttling settings are not enforced properly and automatically initiate a shutdown process.

In one embodiment, the estimation of the power usage is obtained from adding together the maximum powers which could be consumed by the non-throttled subsystems (components). Such an estimate can be done when the system is designed; and the result can be a constant. However, such an estimate is extraordinarily conservative, which may unnecessarily cause the system to force a throttled subsystem (component) into a low performance setting.

In one embodiment, the main processor performs a fairly detailed power analysis based on the characteristics of the subsystems and the current state of the subsystems. The analysis result is then used to determine the maximum power the non-throttled subsystems can consume at the current state of the operating conditions of the subsystems.

For example, the main processor may look at all of the system's USB (Universal Serial Bus) ports, and, if a device is actually plugged into the port, extract the descriptor from the device which reports the device's power consumption, and use the information from the descriptor in the power analysis.

Such a detailed analysis can result in best possible estimate. However, such a detailed analysis may require non-trivial changes to software running on the main processor to provide the power consumption information.

In one embodiment of the present invention, the signals used for normal operation of a subsystem (component) are used to determine the global state of the subsystem (component). The power requirement for the current global state is then used to determine the power requirement of the subsystem. Such an approach can generally improve the estimation of the power requirement of non-throttled components of the system without taking on the complexity of a detailed analysis, or making non-trivial changes to the software.

In one embodiment of the present invention, it is observed that many, if not most, of the non-throttled subsystems operate in one or more global states, and those states can be distinguished by looking at signals already necessary for the operation of the subsystem.

For example, a USB port is either in the empty state (where it consumes no power) or the in-use state (where is can consume as much as 2.5 W of power). These states are easily distinguished by looking at the enable signal on the USB power switch.

A USB port has a power switch which is enabled by software when a device is plugged in, and disabled by software when the device is unplugged. The power management can look at the digital enable for the power switch to learn if the connector is empty or full, which lets it decide if it should use 0.0 W or 2.5 W in the calculation.

Alternatively, a crude power measurement for the USB port can be used to determine whether or not the USB port is in the 0.0 W mode. Such a power measurement approached can be used in a system which does not enable/disable the switches.

Ports for an IEEE-1394 serial bus is like USB, except that the device connected to the IEEE-1394 port can draw more power than a USB device. In one embodiment, when the IEEE-1394 port is on, the power management budgets 8 W for the device.

A crude measurement of the disk drive current can tell if the disk is spinning or not (it can tell sleep state from idle state). If the disk is spinning, the maximum power that can be consumed by the disk drive is, for example, 2.5 W (e.g., for read/write access). If the disk is not spinning, it might be told to spin up, so the maximum power that can be consumed power is, for example, 5.0 W for a brief instant (e.g., for spin-up).

For example, a display backlight operates at a number of brightness levels, each with different power consumption; and these brightness levels are easily distinguished by looking at the PWM (Pulse-Width Modulation) control signal running between the display controller and the backlight power supply. A measurement of the duty factor of the PWM signal which runs between the graphics chip and the backlight inverter can be used to estimate the power consumed by the backlight. For example, a very dim backlight is less than a watt; and a full brightness backlight is close to 6 watts. Thus, improvement on the estimation of power used by the display backlight can significantly improve the estimation of power consumption by the non-throttled components.

For example, the PRSNT1#/PRSNT2# pin signals on the PCI (Peripheral Component Interconnect) slot (or similar pin signals from other interconnect slots, such as a PCI Express slot) could be used to estimate the power which might be consumed by the device plugged into the slot and to determine if a slot is empty.

In one embodiment, improved non-throttled power estimation is obtained from bringing the signals which allow the global power states to be distinguished to the agent (e.g., the microcontroller or the main processor) which actually needs the estimate. The power of any subsystem for which no state signal is available to determine the global states is assumed to need maximum power that could be consumed by the subsystem, but the power for any subsystem for which a state signal is available is assumed to be the maximum power in its current state.

Thus, no additional software modules are required to be running on the main processor for the purpose of reporting power requirements other than the software needed to actually run the device. Although the estimate it computes is no better than a worst case estimate in situations where all of the non-throttled subsystems are busy, it provides a considerably better than worst-case estimate in situations where some of the non-throttled subsystems are running at less than worst case. The inventors know that this is a very common case in normal operation. Thus, the approach of using the existing operating signals in the estimation can provide a better estimate for typically usages.

Figure 11:
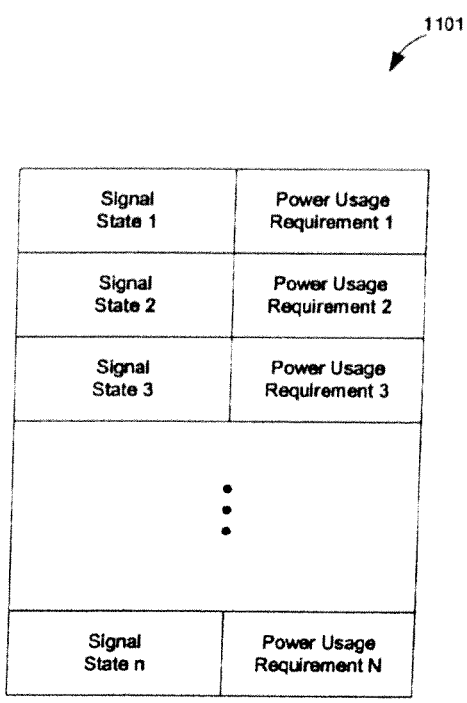
FIG. 11 illustrates a table to look up the power usage requirement of the non-throttled component based on signal states according to one embodiment of the present invention.

FIG. 11 illustrates a table (1101) to look up the power usage requirement of the non-throttled component based on signal states according to one embodiment of the present invention. In one embodiment, the states of the signals are based on the existing signals are designed for the normal operations of the device. Thus, no special design or software module is necessary to obtain the power usage information from the device.

Figure 12:
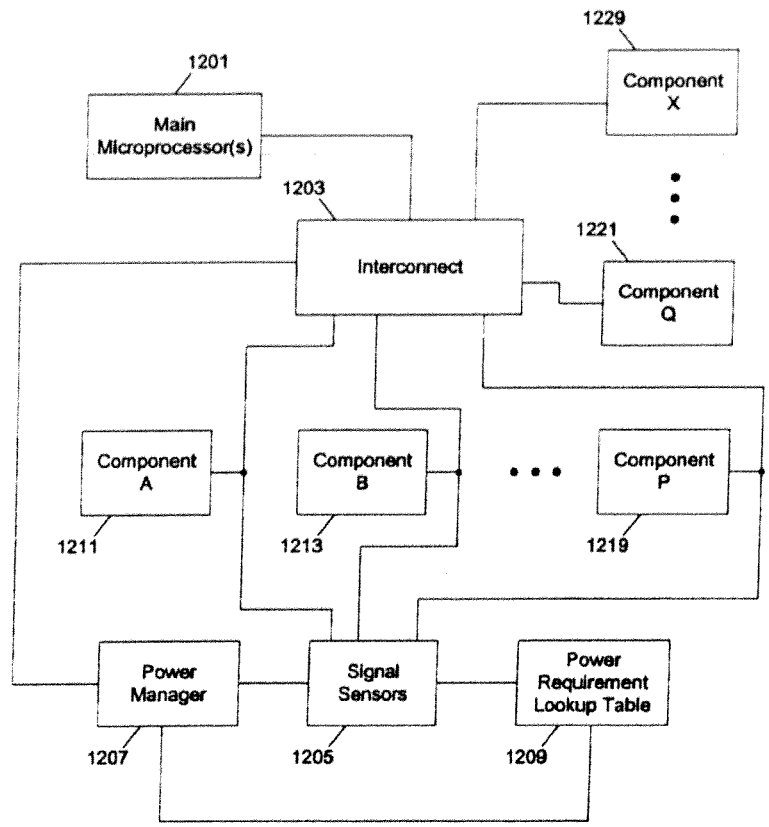
FIG. 12 illustrates a computer system with a power management system according to one embodiment of the present invention.

FIG. 12 illustrates a computer system with a power management system according to one embodiment of the present invention.

In FIG. 12, interconnect (1203) connects various components (e.g., 1211, 1213, . . . , 1219, 1221, . . . , 1229) with the main microprocessor(s) (1201).

In FIG. 12, the power manager (1207) (e.g., implemented as a microcontroller) is used to dynamically determine the throttle settings of the system to balance the performance requirement and the power usage limit.

Signal sensors (1205) are used to monitor selected operating signals from some of the components (e.g., 1211, 1213, . . . , 1219). These operating signals are used by the components (1211, 1213, . . . , 1219) even without the use of the power manager. The signal sensors (1205) tap into these signals to look up estimated power requirements for the components from lookup table (1209). A typical tapped signal can be used to classify the state of the component into one of a plurality of possible states. When operating in some of the states, the component consume less than the maximum possible power. Thus, the signals can be used to look up more accurate power requirements according to the operation condition of the components. Further, one of the sensors in the signal sensors (1205) may be measuring the power levels of one or several different components.

When a component does not have a signal tapped to obtain a better estimation, a conservative estimate based on the maximum possible power used by the component is used. The power manager adds the power requirement for the components (e.g., 1211, 1213, . . . , 1219, 1221, . . . , 1229) to obtain an estimate of power that may be used in the subsequent time interval.

In one embodiment, based on the power requirement for these components and the past power usage history, the power manager (1207) further determines a throttle setting for the main microprocessor(s) (1201) so that the power usage within the next time period will be within the limit of a power constraint even when the main microprocessor(s) are fully busy in the next time period.

In one embodiment, the power manager is partially or entirely implemented as a software module running on the main microprocessor(s) (1201). The lookup table (1209) can also be implemented using a software module using a random access memory of the computer system or using a dedicated hardware module.

Figure 13:
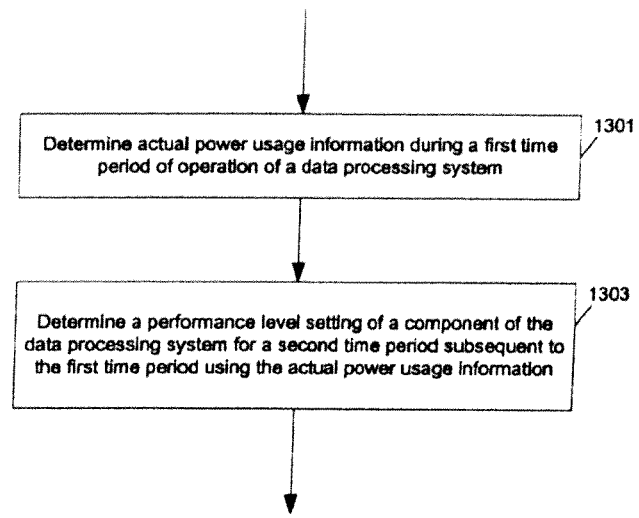
FIGS. 13-16 illustrate methods of power management according to embodiments of the present invention.

FIGS. 13□16 illustrate methods of power management according to embodiments of the present invention.

In FIG. 13, operation 1301 determines actual power usage information during a first time period of operation of a data processing system. The actual power usage information can be in the form of measurement of power, or current (e.g., at a known voltage), or power averaged in time, or current averaged in time, or measurements of other quantities that are indicative of actual power usage. Operation 1303 determines a performance level setting of a component of the data processing system for a second time period subsequent to the first time period using the actual power usage information. The system is set to the determined performance level setting to ensure that the power usage of the system operating at the determined performance level setting in the second time period will not exceed any limit.

Figure 14:
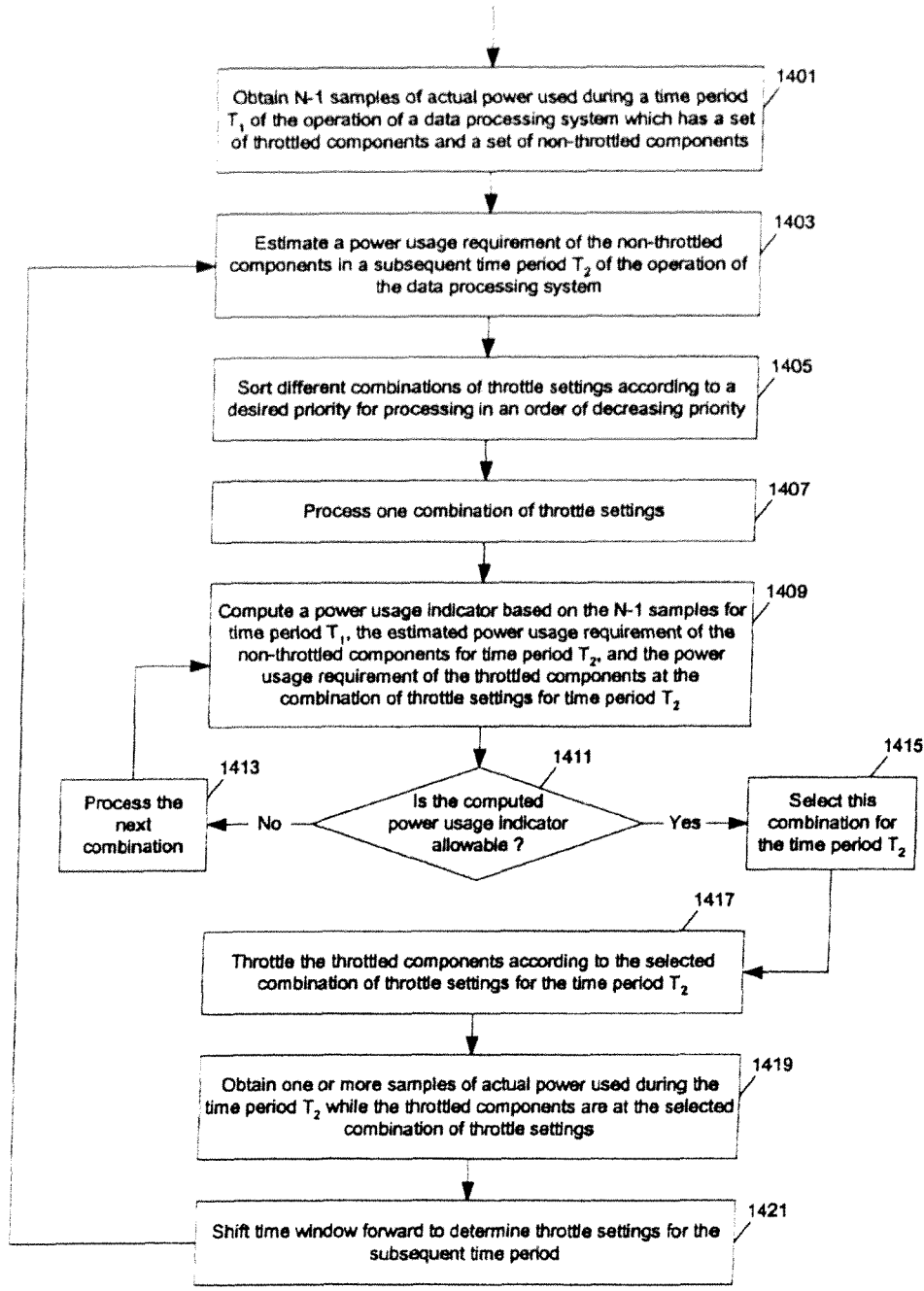

In FIG. 14, operation 1401 obtains N−1 samples of actual power used during a time period $T_1$ of the operation of a data processing system which has a set of throttled components and a set of non-throttled components. In one embodiment, throttled components have different adjustable performance level settings that have different power usage requirements; and non-throttled components are not actively managed/controlled to trade performance level for power usage.

Operation 1403 estimates a power usage requirement of the non-throttled components in a subsequent time period $T_2$ of the operation of the data processing system.

Operation 1405 sorts different combinations of throttle settings according to a desired priority for processing in an order of decreasing priority. In one embodiment, the priorities of the throttle settings depend on the current workload of the different throttled components; and the sorting is performed in real time. In one embodiment, the priorities of the throttle settings are designed to be independent from the current workload of the different throttled components; and the sorting can be performed only once during the design or installation phase.

Operation 1407 processes one combination of throttle settings. Operation 1409 computes a power usage indicator based on the N−1 samples for time period $T_1$, the estimated power usage requirement of the non-throttled components for time period $T_2$, and the power usage requirement of the throttled components at the combination of throttle settings for time period $T_2$. For example, the power usage indicator can be an average power usage, an average battery discharge current, an average heat generation, etc.

If operation 1411 determines the computed power usage indicator is not allowable, operation 1413 processes the next combination; and operation 1409 is repeated, until operation 1411 determines the computed power usage indicator is allowable. In one embodiment, the settings are defined (e.g., by design) so that at least one combination is always allowable; thus, the loop of operations 1409, 1411 and 1413 eventually exits to operation 1415.

When the computed power usage indicator is allowable for a combination of throttle settings, operation 1415 selects this combination for the time period $T_2$. Operation 1417 throttles the throttled components according to the selected combination of throttle settings for the time period $T_2$.

Operation 1419 obtains one or more samples of actual power used during the time period $T_2$ while the throttled components are at the selected combination of throttle settings. Operation 1421 shifts time window forward to determine throttle settings for the subsequent time period. Thus, operations 1403 through 1421 can be repeated for the subsequent time period.

Figure 15:
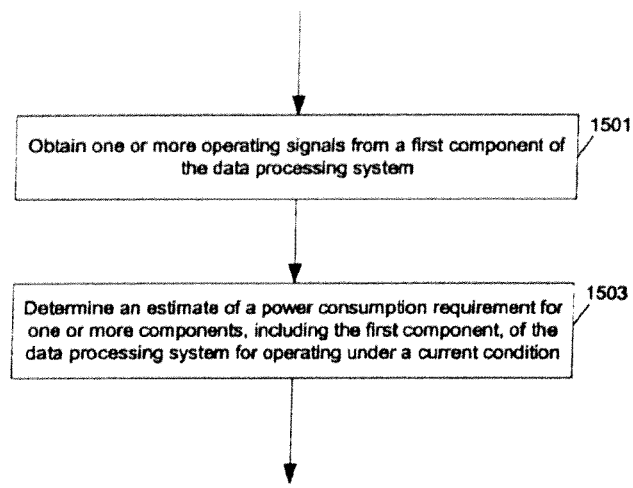

In FIG. 15, operation 1501 obtains one or more operating signals from a first component of the data processing system. In one embodiment, the operation signals are present for the normal operations of the components regardless whether or not the components are under power budget control according to embodiments of the present invention. Such an arrangement can minimize the impact of implementing methods of embodiments of the present invention on the design of the non-throttled components. Alternatively, the non throttled components may be specifically designed to provide signals to dynamically indicate their power usage requirements.

Operation 1503 determines an estimate of a power consumption requirement for one or more components, including the first component, of the data processing system for operating under a current condition.

Figure 16:
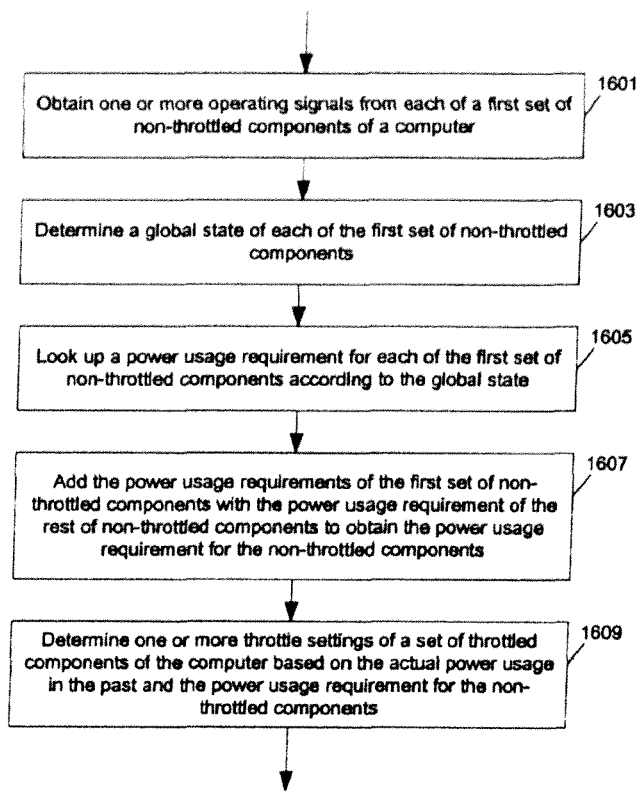

In FIG. 16, operation 1601 obtains one or more operating signals from each of a first set of non-throttled components of a computer. Operation 1603 determines the global state of each of the first set of non-throttled components. Operation 1605 looks up a power usage requirement for each of the first set of non-throttled components according to the global state. Operation 1607 adds the power usage requirements of the first set of non-throttled components with the power usage requirement of the rest of non-throttled components to obtain the power usage requirement for the non-throttled components. Operation 1609 determines one or more throttle settings of a set of throttled components of the computer based on the actual power usage in the past and the power usage requirement for the non-throttled components.

Many of the methods of the present invention may be performed with a digital processing system, such as a conventional, general-purpose computer system. Special purpose computers, which are designed or programmed to perform only one function, may also be used.

Figure 17:
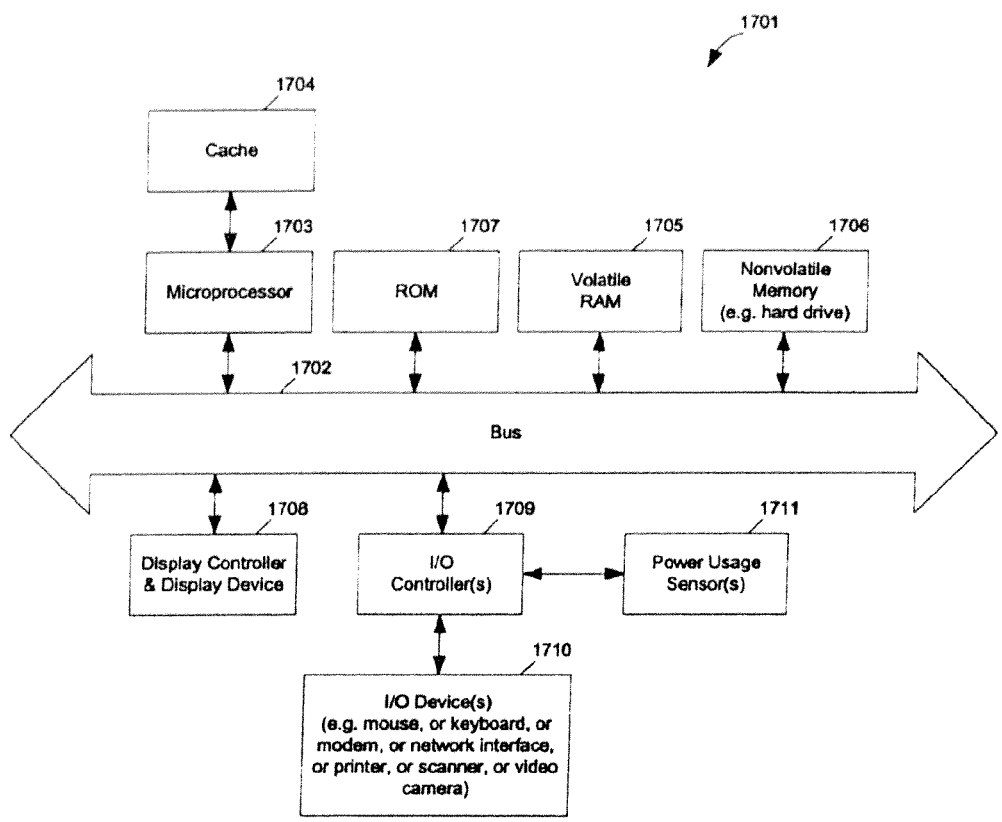
FIG. 17 shows a block diagram example of a data processing system which may be used with the present invention.

FIG. 17 shows one example of a typical computer system which may be used with the present invention. Note that while FIG. 17 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 17 may, for example, be an Apple Macintosh computer.

As shown in FIG. 17, the computer system 1701, which is a form of a data processing system, includes a bus 1702 which is coupled to a microprocessor 1703 and a ROM 1707 and volatile RAM 1705 and a non-volatile memory 1706. The microprocessor 1703, which may be, for example, a G3, G4, or G5 microprocessor from Motorola, Inc. or IBM or a Pentium microprocessor from Intel is coupled to cache memory 1704 as shown in the example of FIG. 17. The bus 1702 interconnects these various components together and also interconnects these components 1703, 1707, 1705, and 1706 to a display controller and display device 1708 and to peripheral devices such as input/output (I/O) devices which may be mice, keyboards, modems, network interfaces, printers, scanners, video cameras and other devices which are well known in the art. Typically, the input/output devices 1710 are coupled to the system through input/output controllers 1709. The volatile RAM 1705 is typically implemented as dynamic RAM (DRAM) which requires power continually in order to refresh or maintain the data in the memory. The non-volatile memory 1706 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 17 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1702 may include one or more buses connected to each other through various bridges, controllers and/or adapters as is well known in the art. In one embodiment the I/O controller 1709 includes a USB (Universal Serial Bus) adapter for controlling USB peripherals, and/or an IEEE-1394 bus adapter for controlling IEEE-1394 peripherals.

In one embodiment of the present invention, at least some of the components can be actively throttled to trade performance for power usage. For example, the microprocessor 1703 may have different core voltage and frequency settings.

In one embodiment of the present invention, the system 1701 further includes power usages sensor(s) 1711 that are coupled to the I/O controller(s) 1709. One or more sensors may be used to determine the power usage of the Central Processing Unit (CPU) (e.g., microprocessor 1703) and/or the Graphical Processing Unit (GPU) (e.g., a processor of the display controller 1708). Further, one or more sensor may be directly coupled to the CPU and/or GPU. The power usage sensor(s) 1711 may include one or more current sensors measuring the actual current drawn by the throttled components, and/or the actual current drawn by the throttled components, and/or the actual current drawn by the system. In one embodiment, the power usage sensor(s) 1711 may include a crude power usage sensor for a non-throttled component to determine the global state of the component, which can be used to dynamically estimate the power usage requirement of the component.

In one embodiment of the present invention, the microprocessor 1703 dynamically budgets power usage and determines throttle settings according to instruction stored in cache 1704, ROM 1707, RAM 1705, and/or nonvolatile memory 1706. Alternatively, the system 1701 further includes a microcontroller (not shown in FIG. 17) to dynamically budget power usage and determine throttle settings. In one embodiment, the data processing system may include multiple central processing unit (CPU)/microprocessors.

It will be apparent from this description that aspects of the present invention may be embodied, at least in part, in software. That is, the techniques may be carried out in a computer system or other data processing system in response to its processor, such as a microprocessor or a microcontroller, executing sequences of instructions contained in a memory, such as ROM 1707, volatile RAM 1705, non-volatile memory 1706, cache 1704, or other storage devices, or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 1703, or a microcontroller.

A machine readable medium can be used to store software and data which when executed by a data processing system causes the system to perform various methods of the present invention. This executable software and data may be stored in various places including for example ROM 1707, volatile RAM 1705, non-volatile memory 1706 and/or cache 1704 as shown in FIG. 17. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

The methods of the present invention can be implemented using dedicated hardware (e.g., using Field Programmable Gate Arrays, or Application Specific Integrated Circuit) or shared circuitry (e.g., microprocessors or microcontrollers under control of program instructions stored in a machine readable medium. The methods of the present invention can also be implemented as computer instructions for execution on a data processing system, such as system 1701 of FIG. 17.

Figure 18:
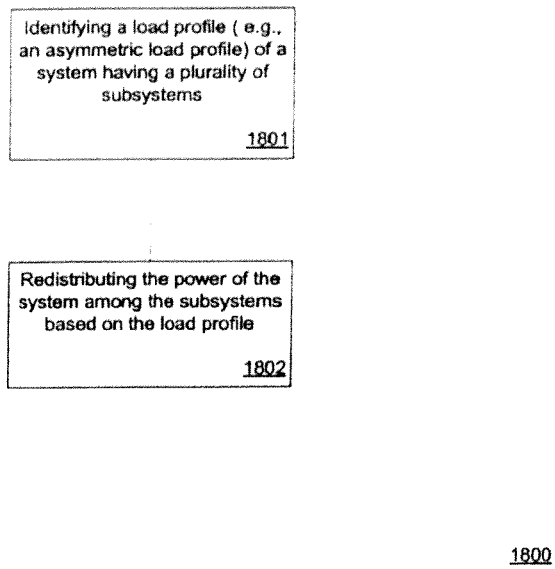
FIG. 18 is a flowchart of one embodiment of a method to dynamically redistribute power in a system.

FIG. 18 is a flowchart of one embodiment of a method to dynamically redistribute power in a system. The method begins with operation 1801 of identifying a load profile of a system. The system has a plurality of subsystems. In one embodiment, the plurality of subsystems includes processors, e.g., a CPU, a GPU, a microcontroller, and the like. The power used by at least a subset of each of the subsystems is controlled, e.g., by a microcontroller, and a maximum power used by each of the subsystems is determined by the dynamic power history of the whole system over an averaging period, as described above with respect to FIGS. 1-17. Such control of power allows higher performance operation in at least certain environments. That is, the subsystems may operate at bursts of substantially high power if there is a considerable low power operation, e.g., a idle time, during the averaging period, as described above with respect to FIGS. 1-17. In one embodiment, the power of the subsystems may be controlled such a way that the maximum power used by each of the subsystems may be increased or reduced in unison, e.g., synchronously.

A load profile of the system is defined by workloads of each of the subsystems in the system. A workload of a subsystem may be determined using various techniques. In one embodiment, a workload of a subsystem determines the amount of power used by the subsystem in the system. In another embodiment, the operating system may determine the workload of the subsystem out from historical scheduling data, or an application may explicitly inform the system about the workload. Various applications provide various workloads to each of the subsystems. For example, program development tools and scientific applications present a high load to the CPU, but almost no load to the GPU that leads to an asymmetric load profile of the system (e.g. the CPU consumes a lot more power than the GPU). Many professional applications present an alternating high workload to the CPU and to the GPU that results in an alternating asymmetric load profile of the system. Advanced user interfaces or graphics editing application present a high load to the GPU and a modest load to the CPU that leads to another asymmetric load profile to the system. In one embodiment, the load profile may be identified using workloads determined by measuring/sensing power (e.g. current drawn) by each subsystem or by measuring power for certain subsystems and estimating or predicting power for other subsystems or by estimating power for all subsystems. In another embodiment, the load profile may be identified using workloads determined by the operating system out from historical scheduling data. In yet another embodiment, to identify the load profile of the system, the information about the workload of the subsystem provided by an application may be used.

After determining the load profile of the system, the method 1800 continues with operation 1802, of redistributing the power of the system among the subsystems based on the load profile. In one embodiment, the power is redistributed in an asymmetric fashion, tracking the workloads of each of the subsystems. Such an asymmetric redistribution of the power improves the user experience, because it allows a system that is incapable of running all of its subsystems at a full speed to appear to be able to do so for many applications. In particular, detecting the asymmetric workloads of the subsystem, and redistributing the power in asymmetric fashion while tracking the workloads of the subsystems is important for small data processing systems such as portable computers or small desktop computers or handheld systems that may be incapable of running all of their subsystems at full speed.

Figure 19:
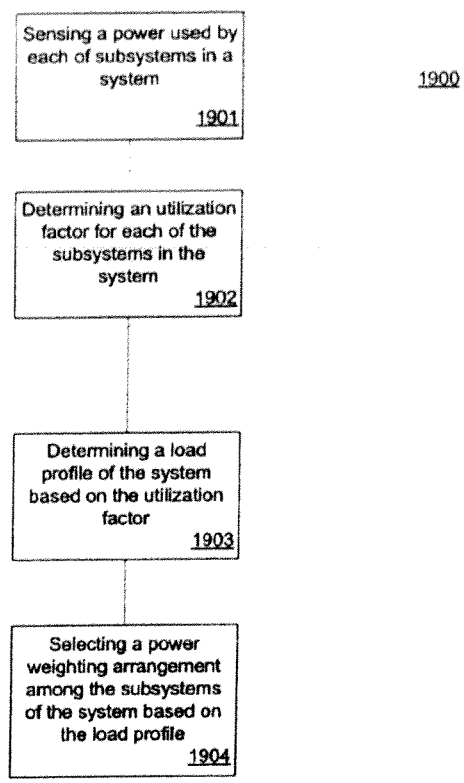
FIG. 19 is a flowchart of one embodiment of a method to dynamically redistribute power based on a load profile of a system.

FIG. 19 is a flowchart 1900 of one embodiment of a method to dynamically redistribute power by tracking a load profile of a system. The method begins with operation 1901 by sensing an actual power used by each of subsystems in a system. In one embodiment, a maximum power of a subsystem is controlled, as described above with respect to FIGS. 1-17. In one embodiment, an actual power used by each of the subsystems is measured by one or more sensors (not shown) coupled to each of the subsystems. One or more sensors may be connected to each of the subsystems using, for example, a wire, or the sensors may be directly attached to the subsystems. In one embodiment, the one or more sensors used to measure actual power usage by each of the subsystems are the sensors as described above with respect to FIGS. 4, 5, 12, and 17. Alternatively, power consumed by one or more subsystems may be estimated. Next, in operation 1902, an utilization factor for each of the subsystems in the system is determined. The utilization factor may be considered as a power efficiency metric for a subsystem in the system. In one embodiment, the utilization factor is a ratio of the power used by the subsystem, e.g., the power measured by a sensor over a time interval divided by the power that is budgeted ("allocated") to the system (or the subsystem itself) over the same time interval. In one embodiment, the power for the system is allocated through the power redistribution algorithm, using the dynamic power history of the whole system over an averaging period, as described above with respect to FIGS. 1-17. In one embodiment, the utilization factor for each of the subsystems is a number between 0 and 1.0. In alternate embodiments, other numbers for the utilization ratio for each of the subsystems may be used. A value of 1.0 may indicate a full utilization of allocated system power by a subsystem, and a value of 0 may indicate that the subsystem is in a low power mode, e.g., is turned off, idle, or in a sleeping mode.

Next, the method 1900 continues with operation 1903 which involves determining a load profile of the system based on the utilization factors of each of the subsystems. In one embodiment, each of the subsystems has a controlled operating power. In one embodiment, the load profile of the system is calculated using the utilization factors of each of the subsystems. For example, to calculate the load profile of the system having two subsystems, a utilization factor of one subsystem is subtracted from the utilization factor of the other subsystem. For example, in the system that contains two subsystems, if the utilization factor of a first subsystem is 0.25, and the utilization factor of a second subsystem is 0.75, the load profile of the system is 0.5. That is, the load profile is shifted asymmetrically towards the second subsystem. In one embodiment, the load profile of the system, which contains two subsystems calculated using the utilization factors of each of the subsystems that are numbers in the approximate range of 0.0 to 1.0, is a number in the approximate range of 1.0 to −1.0. Further, a value near 1.0 or −1.0 may indicate a substantially asymmetric load profile of the system. The substantially asymmetric load profile means that the power of the system could be shifted to operate one or more of the subsystems at high power, while the other one or more of the subsystems operate at a low power, e.g., are idle. Further, for example, if the utilization factor of the first subsystem and the utilization factor of the second subsystem are approximately equal, the load profile is about 0.0. Numbers about 0.0 may indicate that the load profile is balanced. That is, the power of the system could be evenly redistributed among subsystems in the system. In another embodiment, the load profile is an array of numbers that includes the utilization factors of each of the subsystems. For example, for the system having two subsystems, the load profile of [1.0, 0.5] or [−0.5, −1.0] is an asymmetric load profile, and the load profile of [0.5, −0.5] is a balanced load profile. It will be appreciated that a variety of alternative ways to define and calculate the load profile and/or the utilization factors may be used in alternative embodiments of the invention.

After determining the load profile of the system, the method 1900 continues with operation 1904 which involves selecting a power weighting strategy (which may be considered a power weighting arrangement among the subsystems) of the system based on the load profile. In one embodiment, the power weighting strategy is selected based on the value of the load profile. The power weighting strategy may be an asymmetric weighting, or a balanced weighting. For example, if the load profile is about 1, −1, [1.0, 0.5], or [−0.5, −1.0], a substantially asymmetric power weighting arrangement among the subsystems is selected. For example, if the load profile is about 0.0, [0.5, 0.5], or [0.5, −0.5], a substantially balanced power weighting arrangement among the subsystems is selected. In one embodiment, if all subsystems of the system are idle, the load profile is about 0.0, and the balanced strategy is selected. That is, the system is balanced at rest, and only moves towards an unbalanced strategy when it is actively unbalanced. In certain embodiments, this allows the system to correct itself very quickly by shifting from an asymmetric power strategy to a balanced power strategy.

In one embodiment, a power weighting strategy is selected based on the load profile by selecting a power distribution table out of a plurality of power distribution tables stored in a memory of the system. Generating the power distribution tables corresponding to various load profiles is described in further detail below with respect to FIGS. 22A to 22C, and FIG. 23.

Figure 20:
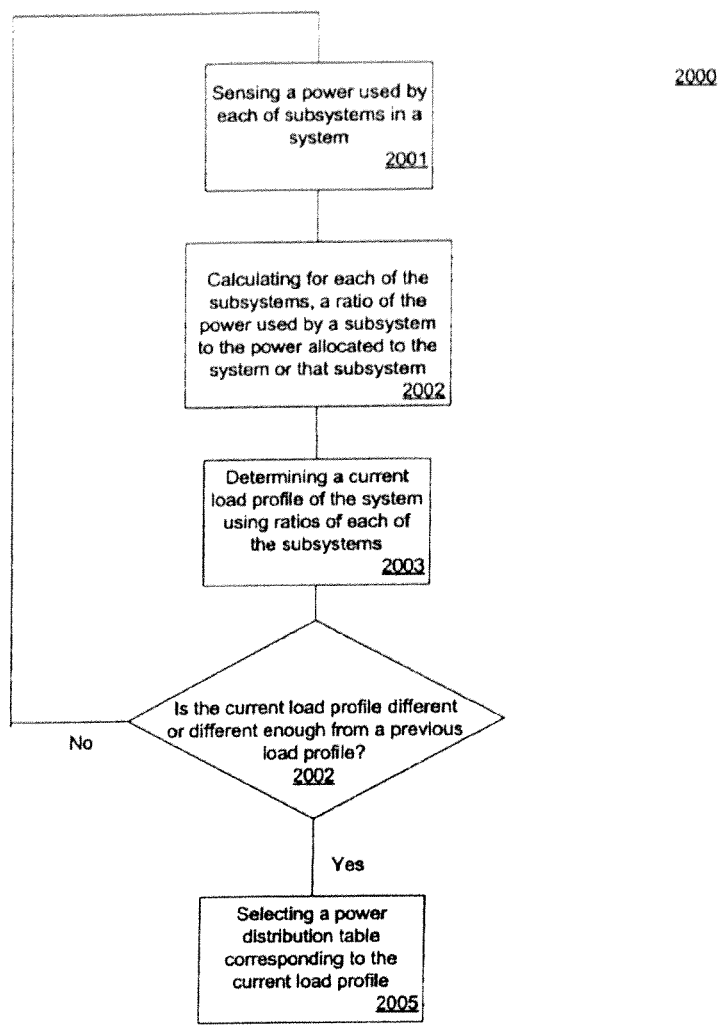
FIG. 20 is a flowchart of another embodiment of a method to dynamically redistribute power based on a load profile of a system.

FIG. 20 is a flowchart 2000 of another embodiment of a method to dynamically redistribute power while tracking a load profile of a system. The method 2000 begins with operation 2001 of sensing (e.g. measuring) an actual power used by each of subsystems in a system, as described above with respect to FIG. 19. Alternatively, power used by some subsystems may be measured while power used by other subsystems may be estimated or power used by all subsystems may be estimated. The method 2000 continues with operation 2002 which involves calculating for each of the subsystems a ratio of the power used by a subsystem to the power allocated to the system or that subsystem (the utilization factor). The utilization factor for each of the subsystems may be calculated as described above with respect to FIG. 19. Next, in operation 2003, a current load profile of the system is determined using ratios of each of the subsystems, as described above with respect to FIG. 19. In operation 2004, a determination is made whether the current load profile is different (or different enough) from a load profile determined in a time interval preceding the current time interval. In one embodiment, the current load profile of the system is compared with the previous load profile stored in a memory. If the current load profile is different from the previous load profile, a power distribution table corresponding to the current load profile is selected in operation 2005. If the current load profile is not different (or not different enough, for example, the difference is less than a threshold value) from the previous load profile, the method continues with operation 2001 of sensing the power used by each of the subsystems.

FIGS. 21A-21C illustrate one embodiment of power distribution tables built for a system that includes a CPU subsystem and a GPU subsystem. The power distribution tables depicted in FIGS. 21A-21C correspond to different load profiles, e.g., asymmetric and balanced load profiles. As shown in FIGS. 21A-21C, the table 2100 has columns 2101, 2102, 2103, and 2104, and rows 2105. Rows 2105 correspond to different settings of the system for a balanced load strategy. Settings of the system may be, e.g., different clock, and different core voltage settings, as described above with respect to FIGS. 1-17. Each setting is associated with an amount of power P allocated to the system. As shown in FIGS. 21A-21C, the amounts P1-P3 of power P allocated to the system at settings 1-3 is the same for all tables 2100, 2110 and 2120. Column 2104 includes amounts P1-P3 of power P allocated for the system at various system's settings. In one embodiment, allocating the power P corresponding to different system's settings within a given table is performed using methods described above with respect to FIGS. 1-17. Columns 2102 and 2103 include amounts of power that each of the subsystems, e.g., CPU and GPU, uses to operate at different system settings. FIG. 21A illustrates a power distribution table that corresponds to a balanced load profile K1 (e.g., 0.5, 0.5). As shown in FIG. 21A, each of CPU and GPU consumes about a half of the power allocated to the system at each of the settings 1-3. That is, for table 2100 the power of the system is substantially evenly distributed (e.g. allocated or budgeted) among the subsystems and corresponds to a balanced load profile K1 e.g., [0.5, 0.5] of the system. Table 2100 may be selected to run applications that require both CPU and GPU to be about equally busy. FIG. 21B illustrates a power distribution table that corresponds to a CPU-heavy load profile K2 e.g., [0.75, 0.25]. As shown in FIG. 21B, at each of settings 1 to 3, CPU consumes about 75%, while GPU consumes about 25% of the power allocated for the system. That is, for table 2110, the power of the system is shifted towards CPU and corresponds to an asymmetric load profile K2 e.g., [0.75, 0.25], of the system. Table 2110 may be selected when workload of the system is very CPU intensive, such that CPU consumes a substantially bigger share of the total system's power, while a graphics processor is hardly used at all. FIG. 21C illustrates a power distribution table that corresponds to a GPU-heavy load profile K3 e.g., [0.25, 0.75]. As shown in FIG. 21C, at each of the settings 1 to 3, GPU consumes about 75%, while CPU consumes about 25% of the power allocated for the system. That is, for table 2120, the power of the system is shifted towards GPU and corresponds to an asymmetric load profile K3 e.g., [0.75, 0.25] of the system. Table 2110 may be selected when workload of the system is very graphics intensive, such that GPU consumes a substantially bigger share of the total system's power, while a CPU is hardly used at all. As shown in FIGS. 21A-21C, tables 2100, 2110, and 2120 are built such a way that if a system moves from one system setting, e.g. from setting 1, to another system setting, e.g., setting 2, the power needed to operate each of the subsystems increase or decrease at the same time. That is, for each of tables 2100, 2110, and 2120, when performance of the system transitions between system power settings 1-3 within the same power distribution table, the load profile of the system does not change. Selecting a table out of a plurality of power distribution tables associated with different load profiles while tracking the workloads of each of the subsystems using one or more sensors provides an opportunity to select a proper table, e.g., table 2100, 2110, or 2120, based on the load profile of the system at a current moment of time. That is, by just following a power usage pattern, the system's character can be dynamically changed with a substantially high accuracy, so as to be a balanced system, a CPU-heavy machine, a GPU-heavy system, or any other subsystem-heavy system, without using complicated software. As a result, efficient, dynamic power management for the system is provided, where portions of the hardware (processors, buses, memories, and other subsystems) may have their performance, and, as a side effect, their power, adjusted fairly transparently to the software, based on the present workloads of the subsystems. For example, the power of the system may be provided to a more busy GPU, while causing the CPU to slow down without affecting performance of the CPU. That is, a GPU can work at a higher speed in exchange for slowing down the operations on the CPU without visibly affecting the user's perception of the performance of the CPU while the GPU's performance is visibly improved. In another embodiment, for compute bound applications and memory bound applications, the power of the system may be dynamically redistributed between the CPU and a memory, while tracking actual workloads of each of the CPU and the memory. In yet another embodiment, the performance of a system, e.g., a portable computer, may alternate between GPU-heavy table 2120 and CPU-heavy table 2110 continuously (this kind of workload happens frequently in the frame-by-frame processing of digital video). This dynamic shifting of allocated power to various subsystems, based on monitoring a current load profile, is particularly useful for small, thin laptop computers which have small batteries and may not have cooling systems with large cooling capabilities, and this dynamic shifting is also particularly useful for small desktop computers (e.g. Mac Mini) which may not have cooling systems with large cooling capabilities.

Figure 22:
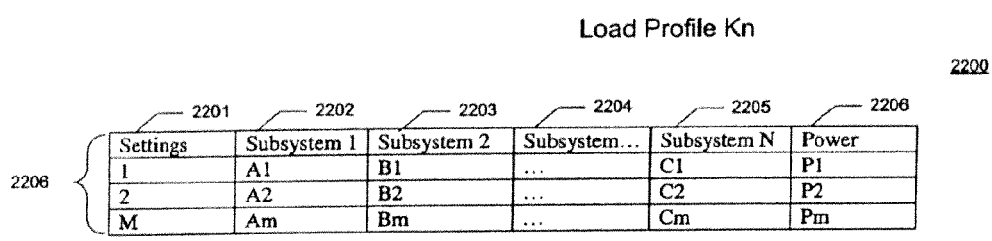
FIG. 22 illustrates one embodiment of one of the power distribution tables associated with a load profile Kn for a system, which includes a plurality of subsystems 1 to N.

FIG. 22 illustrates one embodiment of one of power distribution tables 2200 associated with a load profile Kn for a system, which includes a plurality of subsystems 1 to N. In one embodiment, subsystems 1 to N include core logic functions, memory, CPU, disk drives, GPU, peripheral devices, buses, and any other devices that have controlled power. As shown in FIG. 22, the power distribution table includes columns 2201-2205, and rows 2207. Rows 2207 correspond to different settings of the system, as described above with respect to FIGS. 21A-21C. Column 2206 includes powers allocated for the system at different system's settings, as described above with respect to one of the tables in FIGS. 21A-21C. In one embodiment, amounts P1-Pm of power P may be placed in descending, or ascending order across column 2206. Columns 2201-2204 include amounts P1-Pn of power P that each of the subsystems 1-N is allocated to operate at different system settings. The system may have any number of power distribution tables 2200 associated with different load profiles of the system depending on the operating points that are needed to be enabled in a system. In one embodiment, the plurality of tables 2200 have the same amounts P1-Pm of power P allocated for the system at settings 1 . . . M. Tables, such as table 2200, are created in such a way that a sum of the powers needed to operate each of the subsystems at each of settings 1-M (across each of rows 2207) does not exceed a corresponding amount of power P1-Pm allocated to the system at a corresponding setting 1-M. Tables, such as table 2200, may differ from one another by a proportion of work that each subsystem 1-N is allowed to perform for a load profile Kn. After a power distribution table 2200 is selected, the system's performance may move up and down across column 2206. In one embodiment, if the performance of the system requires an increase in total power, the performance moves up across the column e.g., from system's setting M to system's setting 1. In one embodiment, entries A1 . . . . Am, B1 . . . Bm, and C1 . . . Cm into table 2200 may be provided from the characteristics of the components from which each of the subsystems 1 . . . N is built. For example, a palette of frequencies, and/or core voltages may be used to produce power entries for CPU and GPU.

In one embodiment, the amounts of power in table 2200 may be represented in power units, e.g., watts, milliwatts, and the like, or in arbitrary units. In another embodiment, instead of the amounts of power in power units, table 2200 may include various amounts of current needed to operate the system and the needs of each of the subsystems at different system settings represented in units of current, e.g., amperes, milliamperes, and the like. In alternate embodiments, table 2200 may include various operating frequencies or voltages that correspond to different systems settings.

Figure 23:
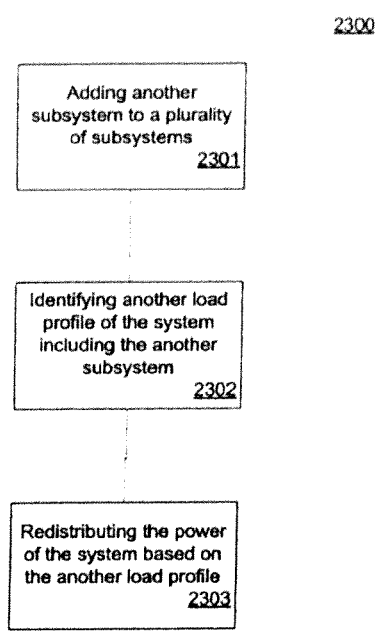
FIG. 23 is a flowchart of one embodiment of a method to dynamically redistribute power while tracking a load profile of a system when another subsystem is added to the system.

FIG. 23 is a flowchart of one embodiment of a method to dynamically redistribute power while tracking a load profile of a system when another subsystem is added to the system. The method begins with operation 2301 of adding another subsystem to a plurality of subsystems. In one embodiment, another subsystem, e.g., a second CPU, or a peripheral device, is added to the system which already includes a first CPU and a GPU. Adding another CPU or a peripheral device to the processing system is known to one of ordinary skill in the computer art. Next, in operation 2302 identifying another load profile of the system that includes an added subsystem is performed, as described above with respect to FIGS. 19 and 20. In one embodiment, the another load profile is identified by determining the utilization factor of the added subsystem, as described above with respect to FIGS. 19 and 20. The load profile is then calculated using the utilization factors for each of the subsystems including the added subsystem, as described above with respect to FIGS. 19 and 20. Next, in operation 2303, the power of the system is redistributed between the subsystems based on the another load profile, as described above with respect to FIGS. 19 and 20. In one embodiment, adding another subsystem may require more power to be allocated to the system. In such a case, the power of the system may be redistributed by selecting a power distribution table associated with another load profile and with more total allocated power.

Figure 24:
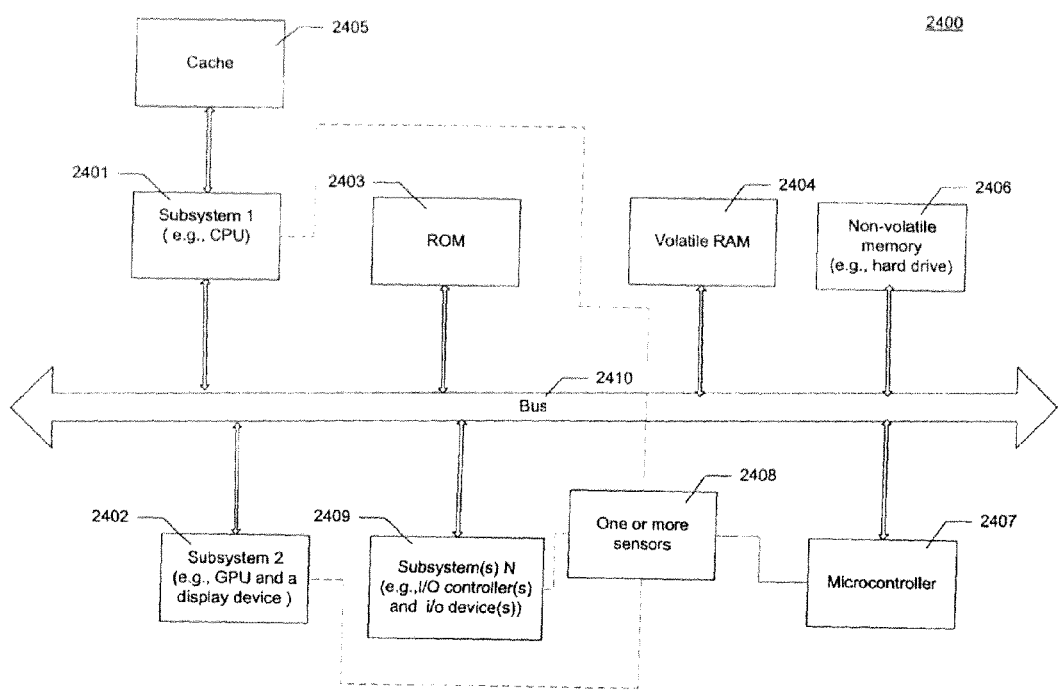
FIG. 24 illustrates one embodiment of a system to dynamically redistribute the power while tracking a load profile of a system.

FIG. 24 illustrates one embodiment of a system to dynamically redistribute the power while tracking a load profile of a system as described above with respect to FIGS. 18-23. As shown in FIG. 24 system 2400 includes a subsystem 2401, e.g., a CPU, a subsystem 2402, e.g., a GPU that may be coupled with a display device, and one or more subsystems 2409, e.g., one or more I/O controllers coupled to one or more I/O devices, and a microcontroller 2407 coupled to a bus 2410. Further, system 2400 includes a volatile RAM 2404, a non-volatile memory 2406, e.g., a hard drive, ROM 2403, and a cache memory 2405 coupled to subsystem 2401 which is coupled to bus 2410. One or more sensors 2408 as described above with respect to FIGS. 4,5, 12, and 17 are coupled to subsystems 2401, 2402, 2409, and to microcontroller 2407, as shown in FIG. 24. The sensors may be used to measure or estimate actual power usage by one or more of the subsystems, and the sensors in turn provide the determined power usage values to the microcontroller which may calculate the utilization factors and the corresponding load profile and use the corresponding load profile to select a power distribution table from the plurality of power distribution tables. Components of the system 2400, including processors, microcontrollers, buses, I/O controllers, I/O devices, memories, sensors are described in detail above with respect to FIGS. 1-17. In one embodiment, a plurality of power distribution tables corresponding to various load profiles as described above with respect to FIGS. 21A-21C, and 22, may be generated by subsystem 2401, and stored in any of memories 2406, 2404, and 2405 or within a memory in the microcontroller 2407. In one embodiment, microcontroller 2407 performs methods described above with respect to FIGS. 19-21 using power distribution tables generated when system 2400 was designed. In another embodiment, subsystem 2401, rather than microcontroller 2407, performs methods described above with respect to FIGS. 18-20 and in yet another embodiment, subsystem 2401 and the microcontroller 2407 together perform the methods described above with respect to FIGS. 19-20.

Figure 25:
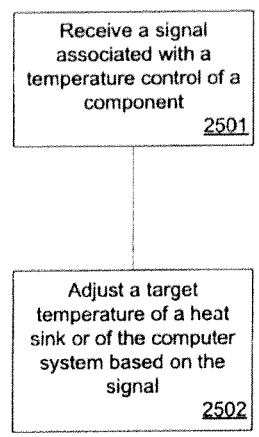
FIG. 25 is a flowchart of one embodiment of a method to adjust a target temperature of a computer system.
Figure 26A:
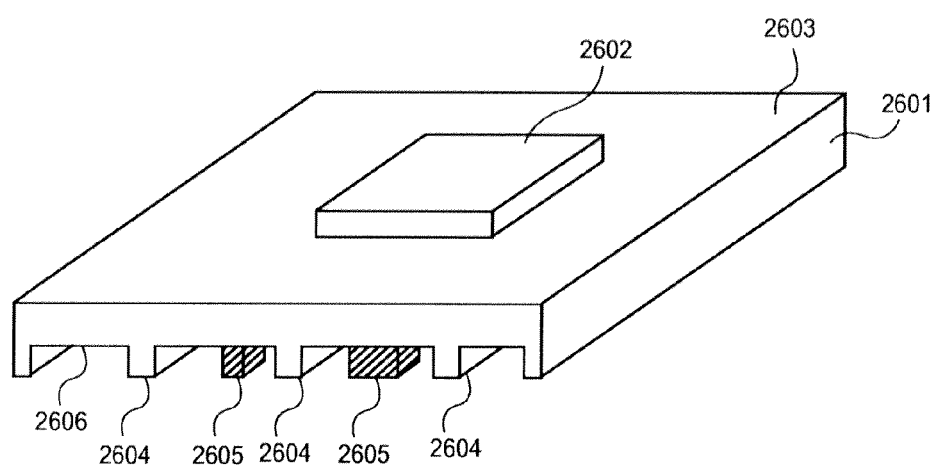
FIG. 26A illustrates one embodiment of a system having a component, such as one or more microprocessors, coupled to a heat sink.

FIG. 25 is a flowchart of one embodiment of a method to adjust a target temperature of a computer system or of a component in the computer system. The method begins with operation 2501 of receiving a signal associated with a temperature control of a component, e.g., a die. In one embodiment, the component of the computer system is coupled to a cooling system, e.g., a heat sink and the component includes an integrated circuit which is a microprocessor. Generally, the heat sink is an object used to take heat away from another object, such as a microprocessor, to stabilize the temperature of the another object. As such, the heat sink can reduce the temperature of the another object. FIG. 26A illustrates one embodiment of a system having a component 2602, e.g., a die, coupled to a heat sink 2601. Heat sink 2601 takes the heat away from component 2602 through increased thermal mass relative, to mass of component 2602, and through heat dissipation by conduction, convection, and/or radiation. The heat sink may be made of a thermal conducting material, e.g., a metal, e.g., copper, aluminum, and the like metals. To increase a thermal throughput, a thermal interface material (not shown), e.g., a thermally conductive grease or other material that includes, e.g., colloidal silver, may be placed between the component and the heat sink.

As shown in FIG. 26A, heat sink 2601 includes a flat surface 2603 to ensure a thermal contact with component 2602 to be cooled. As shown in FIG. 26A, heat sink includes an array of comb or fin like protrusions 2604 to increase the surface contact with the air that may increase the rate of the heat dissipation. The heat sink may be coupled to a fan (not shown) to increase the rate of airflow over the heat sink 2601 to increase heat dissipation from the heat sink. Component 2602 may be a microprocessor chip, a CPU, a GPU, a microcontroller chip, a memory chip, and/or any other power handling semiconductor device. In one embodiment, component 2602 may be enclosed in a case. In one embodiment, component 2602 may be a microprocessor chip enclosed in a case, wherein the microprocessor includes a logic circuitry (not shown) including one or more monitors (not shown) that continuously monitor a temperature of component 2602.

For example, component 2602 may be a microprocessor enclosed in the case, as produced by Intel Corporation, located in Santa Clara, Calif. If the temperature of component 2602 exceeds a component-specific threshold, above which component 2602 may fail to operate, the logic circuitry included in the microprocessor engages throttles that can slow down the frequency of the microprocessor to avoid a failure. The logic circuitry produces a signal associated with the temperature control of component 2602, which indicates that the temperature of component 2602 reached the component-specific threshold, e.g. a die-specified threshold. In one embodiment, the signal associated with the temperature control of component 2602 is the low-true signal signal that asserts the PROCHOT# ("PROCHOT_L") pin of an Intel microprocessor. An assertion of the PROCHOT_L pin is an indirect indication that the temperature of heat sink 2601, is substantially high, such that the case, and component 2602 enclosed in the case, have reached the maximum temperature (the component-specified threshold) causing the assertion of PROCHOT_L pin signal.

As shown in FIG. 26A, one or more temperature sensors 2605 monitor the temperature of computer system 2600. In one embodiment, the one or more sensors 2605 are coupled to heat sink 2601 to monitor the temperature of heat sink 2601 and these sensors are in turn coupled to a thermal controller which may be microcontroller which also receives the PROCHOT_L signal (or an indicator of the signal). The one or more temperature sensors and the heat sink which is coupled to these sensors and the thermal controller form a thermal control loop which adjusts cooling operations (e.g. turning a fan or several fans on or off) in response to the sensed temperature of the heat sink. The thermal control loop, through the control of thermal controller, seeks to maintain the measured temperature of the heat sink at or below a target temperature, and the thermal controller adjusts the target temperature up or down in response to assertions (and non-assertions) of the signal which is associated with thermal control of the component such as the PROCHOT_L signal which is on the PROCHOT_L pin). The temperature of heat sink is different from the temperature of component 2602, and/or the temperature of the case that may enclose component 2602. The difference between the temperature of heat sink 2601 and component 2602, and/or the case may be determined by a number of factors that include the nature of heat sink 2601, the thermal interface material between component 2602 and heat sink 2601, and a quality of component/heat sink assembly. The one or more temperature sensors 2605 measure an integrated temperature of heat sink to provide a temperature control of heat sink 2601. In one embodiment, one or more temperature sensors 2605 are placed on a back side 2606 of heat sink 2601, e.g., a cold plate, which is opposite to surface 2603, as shown in FIG. 26A. Positioning sensors 2605 on side 2606 of heat sink 2601 opposite to side 2603 provides measuring an integrated temperature of heat sink 2601 (where the temperature of the heat sink is in effect integrated or arranged over time by the physical mass of the heat sink). That is, substantially all variations of the temperature, e.g., related to component 2602, and/or other components (not shown) of the computer system are integrated into the measured temperature of heat sink 2601. Because of a substantially large thermal mass of heat sink 2601, the integrated temperature of heat sink 2601 changes slowly, such that a temperature control loop of heat sink 2601 does not observe fast temperature changes that are observed by an on-chip thermal sensor. Therefore, the temperature control loop of heat sink 2601 does not require a filter to filter out the fast temperature changes.

Figure 26B:
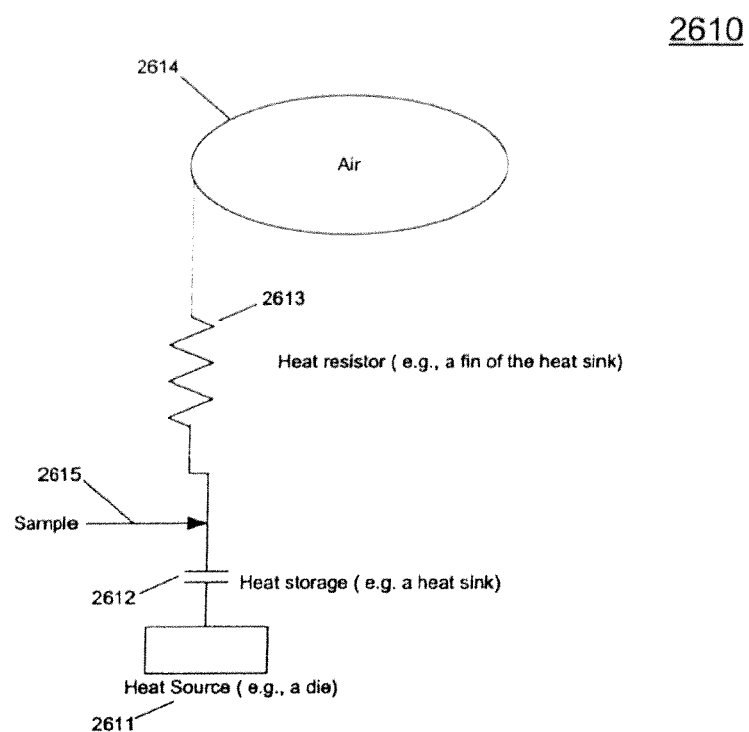
FIG. 26B shows a model of heat dissipation from a component through a heat sink.

FIG. 26B illustrates a model of the thermal behavior of a heat sink. As shown in FIG. 26B, the system includes a heat source 2611, e.g., a die, coupled to a heat storage 2612, e.g., a heat sink. Heat storage 2612 may be considered the thermal inertia of the block of metal of the heat sink. Heat storage 2612 functions as a heat capacitor. As shown in FIG. 26B, heat storage 2612 is coupled to a heat resistor 2613, e.g., a fin of the heat sink. As shown in FIG. 26B, heat resistor 2613 is coupled to air 2614. The temperature measurement may be taken at position 2615 between heat resistor 2613 and heat storage 2612, as shown in FIG. 26B to filter out fast variations of the temperature while maintaining the measurement of the integrated temperature. Position 2615 of one or more sensors to measure the temperature of the system 2610 is chosen to maintain the balance between an integration over time and accuracy of the measurement to provide a stable and accurate temperature control loop. Referring back to FIG. 26A, for example, if one or more sensors 2605 are placed on surface 2603 of heat sink 2601 close to component 2602, fast variations of the temperature of component 2602 may be sensed by sensors 2605 such that the integrated temperature of the heat sink is not measured. In addition, fast variations of the temperature of component 2602 add noise to the measured temperature affecting the accuracy. If one or more sensors 2605 are placed too far away from component 2602, e.g., on one of protrusions 2604 at the edge of heat sink 2601, the ambient temperature, e.g., air temperature, may impact measuring the integrated temperature of heat sink 3202. In one embodiment, as shown in FIG. 26A, one or more sensors 2605 are placed on a back side of heat sink 2601, e.g., on a cold plate. The cold plate is a portion of heat sink 2601 where the heat energy is absorbed and transferred from the heat sink 2601 to e.g., an outside ambient, and a heat removal apparatus, e.g., a fan. Positioning one or more sensors 2605 on the cold plate provides measuring a substantially stable temperature that reflects an amount of energy absorbed by heat sink 2601 while minimizing the impact of temperature variations of component 2602.

The temperature control loop of heat sink 2601 controls, in at least certain embodiments, the temperature of heat sink 2601, such that the temperature does not exceed a target temperature of the heat sink. The temperature control loop of the heat sink is described in further detail below with respect to FIGS. 27-29. Referring back to FIG. 25, the method continues with operation 2502 which involves adjusting a target temperature of the heat sink (or of the computer system) based on the signal associated with the temperature control of the component, such as the PROCHOT_L signal. In one embodiment, the target temperature of the computer system is determined by the target temperature of the cooling system, e.g., by the temperature of the heat sink. In one embodiment, the target temperature of the cooling system is the target temperature of heat sink 2601. The target temperature of heat sink 2601 is adjusted, in at least certain embodiments, to operate component 2602 and the case of component 2602 at a highest possible temperature with minimal cooling. The signal associated with temperature control loop of component 2602, e.g., an assertion of PROCHOT_L pin, provides the information to the temperature control loop of heat sink 2602 that component 2602 and the case of component 2602 have reached the highest possible temperature without the need of knowing the exact value of such highest possible temperature.

Figure 27:
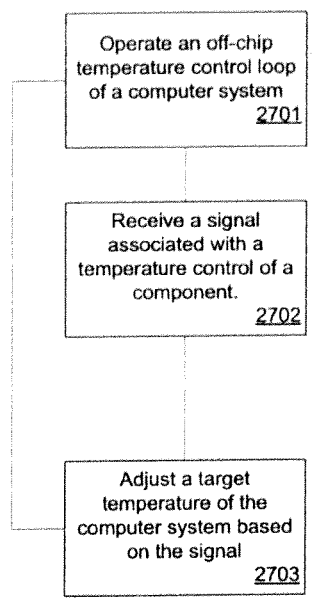
FIG. 27 is a flowchart of one embodiment of a method of operating an adaptive cooling control system of a computer system.

FIG. 27 is a flowchart of one embodiment of a method of operating an adaptive cooling control system of a computer system. Method begins with operation 2701 of operating an off-chip temperature control loop of the computer system. In one embodiment, the off-chip temperature control loop is a heat sink temperature control loop. In one embodiment, operating the heat sink temperature control loop includes measuring a temperature of the heat sink using one or more sensors placed e.g., on the heat sink, and controlling the temperature of the heat sink to stay just below a target temperature of the heat sink, as described above by adjusting the performance of one or more cooling fans and/or other cooling devices. A thermal controller receives temperature measurements from one or more sensors on the heat sink and decides whether to adjust the performance of the cooling devices by comparing the temperature measured on the heat sink to a target temperature for the heat sink. If the measured temperature is less than the target temperature, the thermal controller can decrease the performance of one or more cooling devices (e.g. fans, which generate noise, may be turned off) or can increase the power of the microprocessor or other components, and if the measured temperature is more than the target temperature then the thermal controller can increase the performance of one or more cooling devices, e.g., turn on or increase the fan speed, or can decrease the power of the microprocessor or other components, e.g., by decreasing the operating voltage and/or operating frequency of the microprocessor and/or other components. Next, at operation 2702, a signal (e.g. the PROCHOT_L signal) associated with a temperature control loop of the component is received, as described above. In one embodiment, the temperature control loop of the component operates outside of and independent of the cooling system temperature control loop. The temperature control loop of the component sets the target temperature of the temperature control loop of the cooling system, such as the target temperature of the heat sink. At operation 2703, the target temperature of the cooling system, e.g., the target temperature of the heat sink, is adjusted based on the signal. In one embodiment, adjusting the target temperature of the cooling system is performed using a method described below with respect to FIG. 28.

Figure 28:
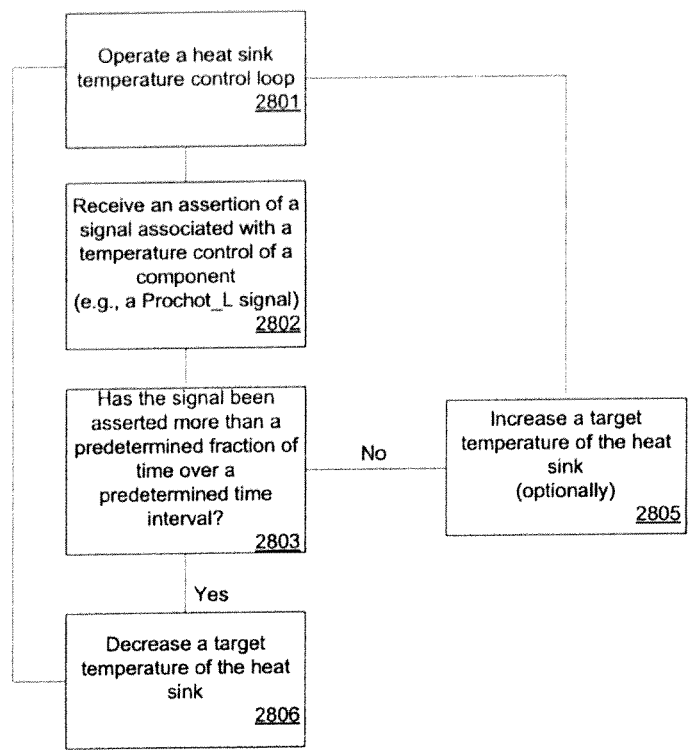
FIG. 28 is a flowchart of one embodiment of a method to adjust a target temperature of a heat sink based on a component-specific signal.
Figure 29:
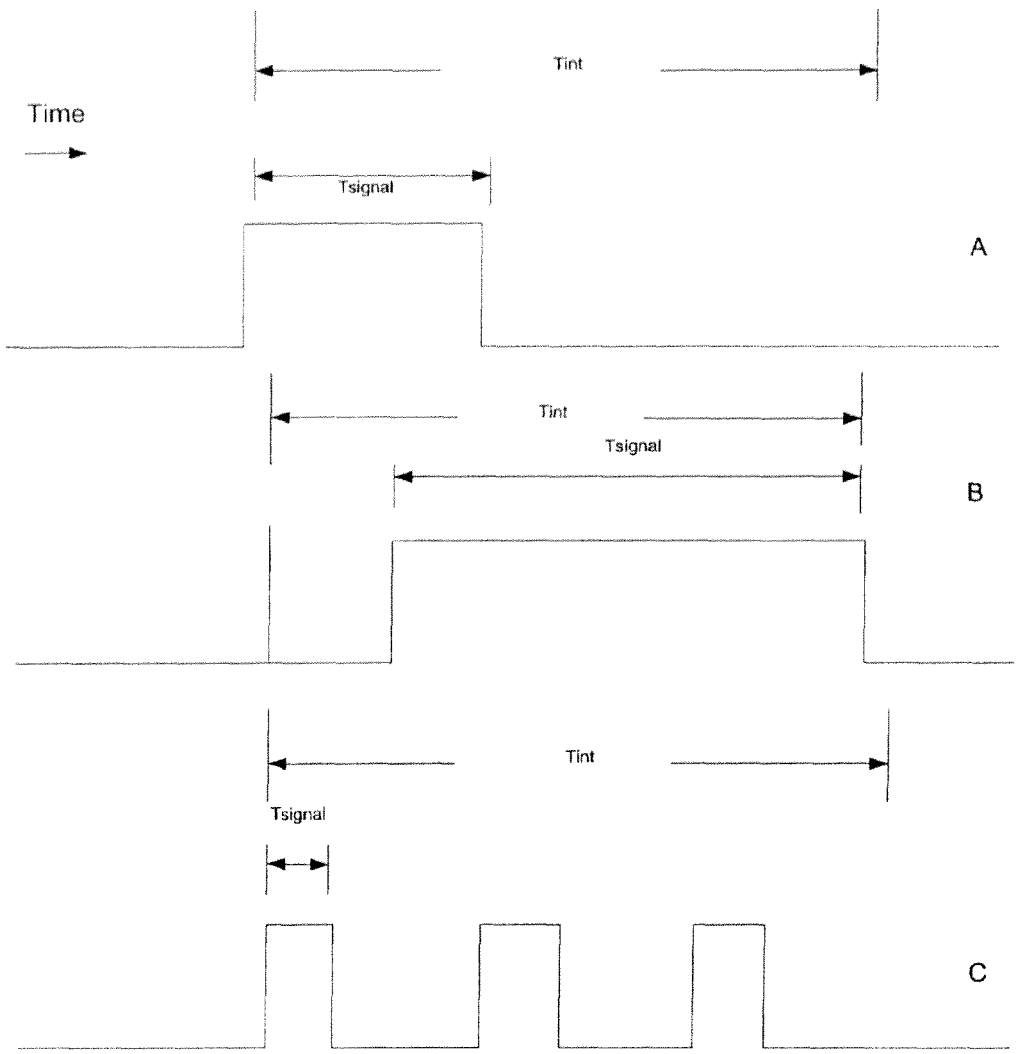
FIGS. 29A-29C illustrate alternate embodiments of signals associated with the temperature of the component.

FIG. 28 is a flowchart of one embodiment of a method to adjust a target temperature of a heat sink based on a component-specific signal. The method begins with operating a heat sink temperature control loop, as described above. At operation 2802, a signal associated with a temperature control of a component, e.g., a PROCHOT_L pin, is asserted, as described above. Next, at operation 2803 an inquiry is made whether the signal has been asserted for more than a predetermined fraction of time over a predetermined time interval. FIGS. 29A-29C illustrate signals associated with the temperature of the component according to one embodiment of the invention. As shown in FIGS. 29A-29C, each of the signals has a duration $T_{signal}$. The duration of the signal indicates for how long the signal, e.g., PROCHOT_L pin is asserted. The duration of the signal $T_{signal}$ may be compared with a predetermined fraction of time over a substantially long averaging time interval $T_{int}$, as shown in FIGS. 29A-29C. The signal may be asserted at any time over the time interval $T_{int}$ and have any duration, as shown in FIGS. 29A-29C. In one embodiment, the ratio $T_{signal}$ to $T_{int}$ may be in the approximate range of 0.001-0.99 depending on the design of the heat sink and the component. As shown in FIG. 29C, the signal having duration $T_{signal}$ may be asserted a number of times during the time interval Tint. Referring back to FIG. 28, if the signal is asserted for more than a predetermined fraction of time over a predetermined time interval, a target temperature of the heat sink is decreased. The target temperature may be adjusted by the factor that is a system dependent function of the averaging time, the accuracy of the sensors, and other system dependent features. In one embodiment, the amount of adjustment of the target temperature is determined by the accuracy of temperature sensors. In one embodiment, the target temperature (if the signal is asserted for more than a predetermined fraction of time over a predetermined time interval), of the heat sink may be decreased by about 0.5% to about 30%. In one embodiment, if the signal is asserted for more than e.g., 0.5 seconds to 3 seconds over e.g., 0.5 minutes to 20 minutes, a target temperature of the heat sink is decreased by e.g., 0.5 degree to 3 degree centigrade. Further, method 2800 goes back to operation 2801. In one embodiment, a predetermined fraction of time for the signal to be asserted may be in the approximate range of 0.5 seconds to 3 seconds and the predetermined time interval over which the predetermined fraction of time is determined, may by in the approximate range of 0.5 minutes to 20 minutes. In one embodiment, the temperature of the heat sink is maintained just below the point at which the signal associated with the temperature control of the component, e.g., a PROCHOT_L pin having a duration, e.g., in the approximate range of 0.5 seconds to 3 seconds is asserted frequently, e.g., not less than 2-5 times over an averaging time interval, e.g., in the approximate range of 0.5 minutes to 20 minutes. In another embodiment, the temperature of the heat sink is maintained just below the point at which the signal associated with the temperature control of the component, e.g., a PROCHOT_L pin, is asserted during a substantially long time (e.g., has a substantially long duration, e.g., in the approximate range of 0.5 seconds to 3 seconds over an averaging time interval, e.g., in the approximate range of 0.5 minutes to 20 minutes. In yet another embodiment, the temperature of the heat sink is maintained just below the point at which the signal associated with the temperature control of the component, e.g., a PROCHOT_L pin having a duration, e.g., in the approximate range of 0.5 seconds to 3 seconds is asserted frequently, e.g., not less than 2-3 times and has a substantially long duration over an averaging time interval, e.g., in the approximate range of 0.5 minutes to 20 minutes. If the signal is not asserted for more than a predetermined fraction of time, e.g., in the approximate range 0.5 seconds to 3 seconds, over the predetermined time interval, e.g., 0.5 minutes to 20 minutes, the target temperature may be optionally increased at operation 2805. In one embodiment, the target temperature may be increased by about 0.5% to about 30%. In one embodiment, if the signal is asserted for less than e.g., 0.5 seconds to 3 seconds over e.g., 0.5 minutes to 20 minutes, a target temperature of the heat sink is increased by e.g., 0.5 degree to 3 degree.

In another embodiment, if the signal is asserted for less than a predetermined fraction of time, e.g., in the approximate range 0.5 seconds to 3 seconds, over the predetermined time interval, e.g., 0.5 minutes to 20 minutes, the target temperature is not adjusted. For example, at certain workloads, or if a fan is temporarily obstructed, the component may generate the signal associated with the temperature control of the component e.g. PROCHOT_L no matter what temperature the heat sink is for small bursts, because it can not get the heat off the component quickly enough. In such cases the target temperature may not be adjusted. Further the method continues with operation 2801. That is, if the signal, e.g., the PROCHOT_L pin, asserts rarely, the control system maintaining the heat sink temperature optionally increases the target temperature to operate the computer system with as little cooling as possible. As such, the temperature control system of the heat sink learns the temperature that corresponds to the minimal amount of cooling, independent of any small variations of the temperature in the component and other components of the system. The temperature control of the computer system dynamically reacts to environmental changes. By dynamically increasing or decreasing a target temperature of the computer system, the temperature control system dynamically adjust key parameters of the computer system, e.g., an acoustics parameters, e.g. a speed of a fan coupled to the heat sink, and/or a temperature of the computer system for a best case operation. That is, the computer system can operate with maximized efficiency at minimal cooling. In one embodiment, operating with minimal cooling with maximized efficiency increases a gradient of the heat across the heat sink. The increased gradient of the heat increases removal of the heat from the heat sink with less air flow. As a result, the cooling system may be operated more efficiently acoustically. For example, if a fan is coupled to the heat sink, increased heat gradient across the heat sink may result in operating the fan with a decreased speed. In one embodiment, the computer systems having the cooling system described with respect to FIGS. 25-29 may be, e.g., a small desktop computer, such as a Mac Mini, or a small laptop such as a small Power Book that are produced by Apple Computer, Inc., located in Cupertino, Calif.

Figure 30:
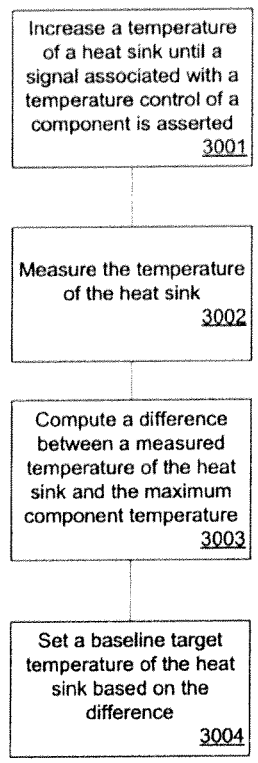
FIG. 30 is a flowchart of another embodiment of a method of using a component-specific signal in a cooling system that includes a heat sink.

FIG. 30 is a flowchart of another embodiment of a method of using a component-specific signal in a cooling system that includes a heat sink, as described above with respect to FIG. 26. Method 3000 determines or estimates a difference between the temperature of heat sink 2601 and component 2602 when component 2602 is at a maximum temperature. Method 3000 begins with operation 3001 of increasing a temperature of a heat sink until a signal associated with a temperature control of a component, e.g., a PROCHOT_L pin, is asserted. In one embodiment, the system is configured in such a way that thermal throttle that typically causes the component, e.g., a CPU, to slow down when PROCSHOT_L, pin is asserted, is not activated, such that the component, e.g., a CPU, continues to operate at the same frequency as before the signal is asserted. In one embodiment, a maximum temperature of the component at which the signal associated with the temperature control of the component is asserted, is measured. In one embodiment, the temperature of the component may be measured using one or more sensors positioned on the component. Method continues with operation 3002 of measuring the temperature of the heat sink after the signal, e.g., the PROCHOT_L pin, is asserted. In one embodiment, the temperature of the heat sink may be measured using one or more temperature sensors coupled to the heat sink, as described above with respect to FIG. 26. Next, at operation 3003, a difference (delta) between a measured temperature of the heat sink and the maximum temperature of the component is computed. The measured temperature of the heat sink may be subtracted from the maximum component temperature. The difference between the temperature of the heat sink and the maximum component temperature provides a baseline for an efficient operational point of a computer system. Method continues with operation 3004 of setting a baseline target temperature of the heat sink based on the difference. In one embodiment, the tolerance parameters for the heat sink/fan assembly may be set based on the computed difference between the temperature of the heat sink and the maximum component temperature. In one embodiment, a compensation for an ambient temperature may be provided, because the thermal resistance of a cooling system may not be linear with ambient temperature. For example, a plurality of measurements at a plurality of temperatures may be performed to compensate for the ambient temperature.

Figure 31:
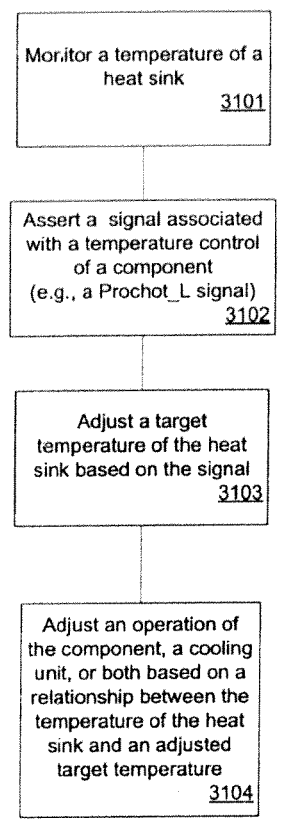
FIG. 31 is a flowchart of one embodiment of a method to operate a cooling system that includes a heat sink.

FIG. 31 is a flowchart of one embodiment of a method to operate a cooling system that includes a heat sink. Method begins with operation 3101 of monitoring a temperature of a heat sink using one or more sensors, as described above with respect to FIG. 26. A component is coupled to the heat sink, as described above with respect to FIG. 26. At operation 3102, a signal associated with a temperature control of the component, e.g., a PROCHOT_L pin, is asserted, as described above with respect to FIGS. 25, 27, and 28. Next, at operation 3103 a target temperature of the heat sink is adjusted based on the asserted signal, as described above with respect to FIGS. 25, 27, and 28. Next, at operation 3104 an operation of the component, a cooling unit, e.g., a fan coupled to the component, or both, is adjusted based on a relationship between the monitored temperature of the heat sink and an adjusted target temperature of the heat sink. In one embodiment, adjusting the operation of the component includes changing an operating frequency of the component, an operating voltage of the component, or both, and adjusting the cooling unit is performed by changing a speed of a fan.

Figure 32:
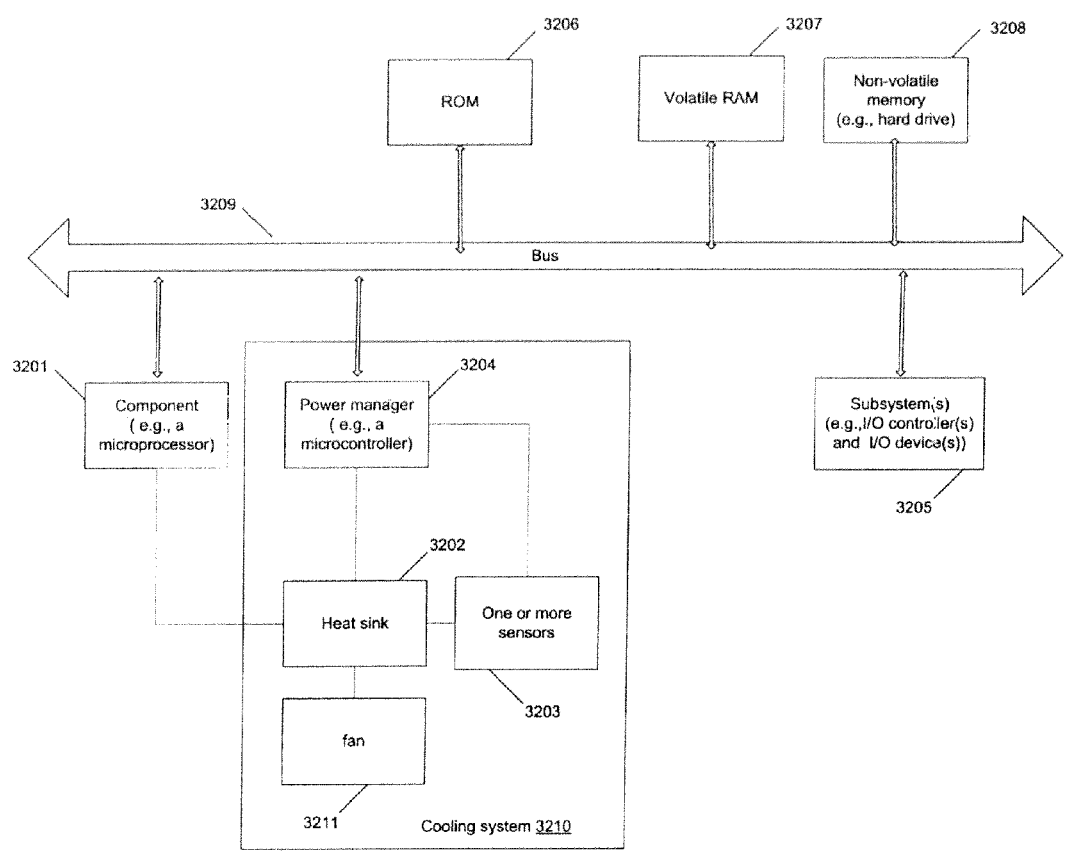
FIG. 32 illustrates one embodiment of a computer system having an adaptive cooling arrangement.

FIG. 32 illustrates one embodiment of a computer system 3200 having an adaptive cooling arrangement, as described above with respect to FIGS. 25-31. As shown in FIG. 32 system 3200 includes a component 3201, e.g., a CPU, a microprocessor, a GPU, a microcontroller, or any combination thereof. As shown in FIG. 32, component 3201 is coupled to a cooling system 3210. As shown in FIG. 32, cooling system 3210 includes a heat sink 3202 coupled to a fan 3211, one or more sensors 3203 coupled to heat sink 3202 to measure and monitor temperature of heat sink 3202, and a power manager 3204, e.g., a microprocessor, to perform methods described above with respect to FIGS. 25-31. The power manager 3204 may also be referred to as thermal controller. A position of the one or more sensors 3202 in cooling system 3210 may be chosen to maintain the best compromise between measuring a stable and accurate temperature control loop, as described above with respect to FIGS. 26A and 26B. In one embodiment, one or more sensors 3203 are placed on a back side of heat sink 3202, e.g., on a cold plate. As shown in FIG. 32, component 3201, power manager 3204, e.g., a microcontroller, a subsystem 3205 that includes e.g., one or more I/O controllers coupled to one or more I/O devices, are coupled through a bus 3209. Bus 3209 may include one or more buses connected to each other through various bridges, controllers and/or adapters as is well known to one of ordinary skill in the art of computer systems. As shown in FIG. 32, a volatile RAM 3207, a non-volatile memory 3208, e.g., a hard drive, and ROM 3206, are coupled to power manager 3204, component 3201 and subsystem 3205 through bus 3209. In one embodiment, power manager 3204 receives a signal associated with a temperature control of component 3201 and adjusts a target temperature of heat sink 3202 based on the received signal, as described with respect to FIGS. 25-31. In one embodiment, power manager 3204 operates a temperature control loop of heat sink 3202. In one embodiment, power manager 3204 increases the temperature of heat sink 3202 to receive the signal associated with the temperature control of component 3201, measures the temperature of heat sink 3202, and determines a difference between a measured temperature of heat sink 3202 and a maximum temperature of component 3201, as described above with respect to FIG.

30. In one embodiment, power manager 3204 sets a baseline target temperature of heat sink 3202 based on the determined difference. In another embodiment, power manager 3204 sets tolerance parameters and/or validates the tolerance parameters of the cooling system based on the determined difference. The power manager 3204 may also perform one or more of the methods described in connection with FIGS. 1-24.

Figure 33:
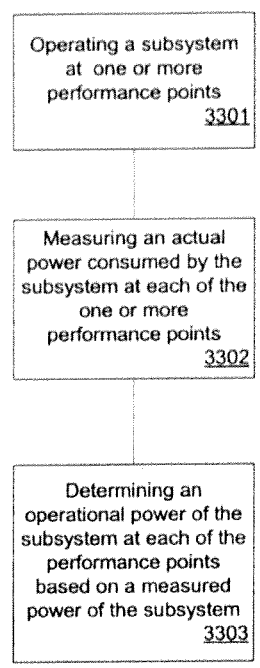
FIG. 33 is a flowchart of one embodiment of a method to manage the power of a computer system that leverages intermediate power points.

FIG. 33 is a flowchart of one embodiment of a method to manage the power of a computer system that leverages intermediate power points. The computer system includes one or more components ("subsystems"). The subsystem may be a microprocessor, a microcontroller, a memory, CPU, a GPU, or any combination thereof. The method begins with operation 3301 of operating a subsystem at one or more performance points. A performance point may be, e.g., an operational frequency that may define an operational speed of the subsystem, a temperature, or a combination thereof. For example, a processor may be operated at a set of frequencies, e.g., at 600 MHz, at 1 GHz, and at 2 GHz at a specified temperature, e.g., a room temperature. The subsystem is operated at well-known conditions at the performance point. For example, the subsystem may be operated to consume the maximum power at the performance point. In one embodiment, the well-known conditions are those that are substantially close to the thermal design point ("TDP") for a worst-case part of the subsystem. For example, the subsystem, e.g., a processor, may be operated with appropriately chosen software, e.g., a known real world application, or a diagnostic software built for testing the processor, e.g., a power grading software. The method continues with operation 3302 of measuring the actual power consumed by the subsystem at each of the one or more performance points. The power may be measured using a precision power measuring circuitry, e.g., one or more sensors, described above with respect to FIGS. 12, 24, and 32. The power measuring circuitry may be built into the subsystem. In one embodiment, the power may be measured at a performance point, which is substantially close to TDP point for the processor, at a temperature at which the processor is operated. The method continues with operation 3303 of determining an operational power of the subsystem based on the measured power of the subsystem at the performance point. For example, a measured actual power consumed by the subsystem, e.g. a processor, is used as an intermediate operational power allocated to the subsystem at a predetermined frequency. That is, the intermediate operational power points are determined on a "per subsystem" basis and may include operational power margins for the subsystem.

Figure 38:
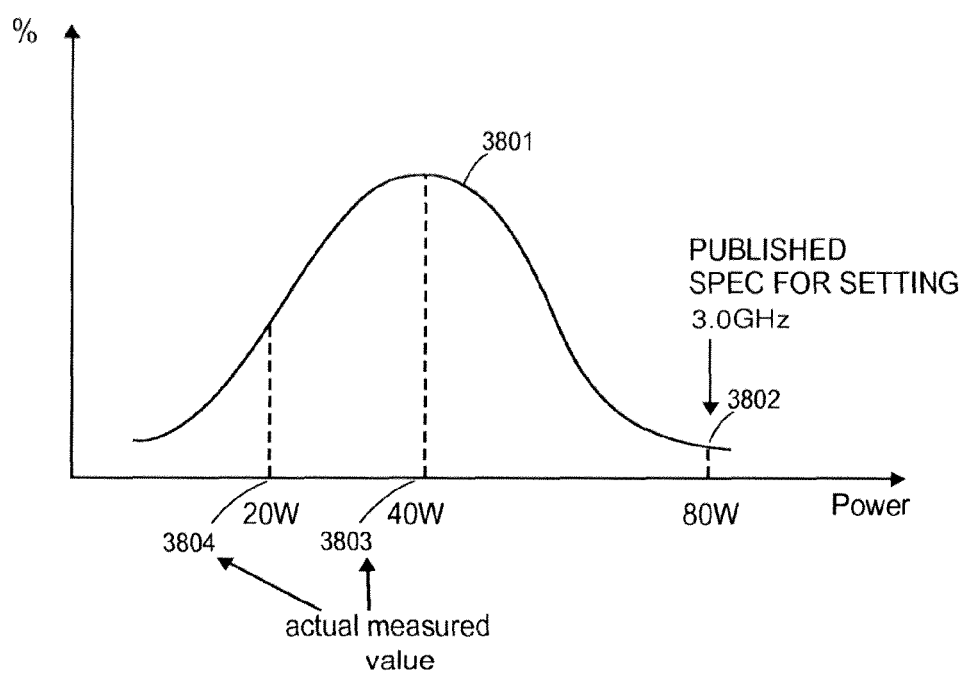
FIG. 38 illustrates one embodiment of an intermediate operational power for a subsystem at various performance points.

FIG. 38 illustrates one embodiment of a data processing system that leverages intermediate operational power points for a subsystem in a valuable way. As shown in FIG. 38, a published specification power 3802 for a subsystem, e.g., a CPU, is 80 W. Such a published specification power is a worst-case power value that is valid for a plurality of subsystems. For example, the published specification power 3802 may be a worst-case power value determined from a statistical power distribution curve 3801 of a vast number of sample processors at a maximum frequency of 3.0 GHz. As shown in FIG. 38, an intermediate operational power point 3803 determined on a "per-subsystem" basis for the CPU at a frequency of 2.5 GHz is 40 W. The intermediate operational power point 3803 is an actual measured power consumed by the subsystem, e.g., the CPU, at a performance point, e.g., at a frequency 2.5 GHz. For example, at the performance point of 1.0 GHz the intermediate operational power point 3803 for the processor may be 20 W. That is, the intermediate operational power point 3803 has an operational margin that is substantially smaller than published specification power 3802, which may be considered an established, predetermined value that has a worst-case power margin defined from the statistical power distribution curve. When the data processing system operates the CPU at these intermediate power points the additional power (40 W or 60 W) may be used by the data processing system to operate, for example, another subsystem, e.g., a GPU at various performance points. In other words, at a given intermediate (or other) operational point (such as a given operating frequency at a given temperature), the system or subsystem may normally consume only a portion (e.g. 70%) of an amount of power which has been reserved for it under a conservative, worst-case design; this margin is often, in fact, unnecessary and can be used by the system or subsystem. In effect, the difference between worst-case and actual power can be allocated to other subsystems. As a further example, the power values in the power distribution tables of FIGS. 21A-21C may include some or all or this difference for each subsystem which is controlled through the use of these power distribution tables. As such, the performance efficiency of the computer system may be substantially increased. In one embodiment, the measured actual maximum power consumed by the subsystem is provided to a power look-up table, as described with respect to FIGS. 6-7, and 21-22. As such, the power look up table is built on the fly, on a "per-subsystem" basis. In one embodiment, the power look up tables may be built that include the measured actual maximum power consumed by each of the subsystems at a set of performance points to allocate the power for the subsystem at different computer system settings. In one embodiment, the measured actual maximum power values consumed by the subsystem at a set of performance points are entered into the power look-up table as the power values that are allocated to the subsystem at various settings.

Figure 34:
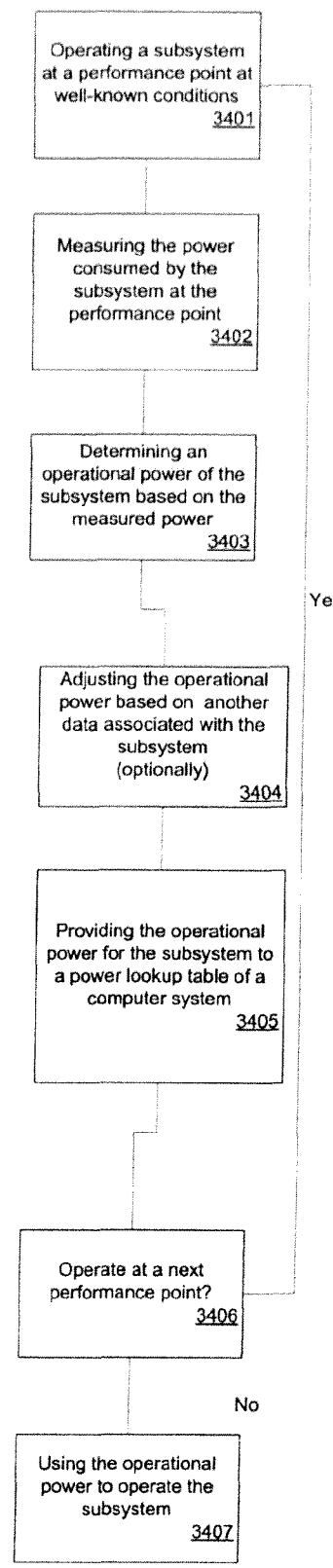
FIG. 34 is a flowchart of one embodiment of a method of providing an intermediate processor power point for a subsystem.

FIG. 34 is a flowchart of one embodiment of a method of providing an intermediate processor power margin for a subsystem. The method begins with operation 3401 of operating a subsystem at well-known conditions at a performance point, as described above. The method continues with operation 3402 of measuring the power consumed by the subsystem at the performance point, as described above with respect to FIG. 33. Next, determining an operational power of the subsystem using the measured power is performed at operation 3403. In one embodiment, the operational power may include operational power margins. Further, at operation 3404 the operational power of the subsystem may be optionally adjusted based on another data associated with the subsystem. The another data associated with the subsystem may be a data provided by a feedback circuitry coupled to the subsystem. The feedback circuitry may provide data associated with the temperature the subsystem. For example, the data associated with the subsystem may be a signal associated with a temperature of a die of the subsystem, e.g., an assertion of PROCHOT_L, pin, as described above. In one embodiment, the operational power may be adjusted to add extra power. The extra power may be added to include a design margin for measuring error, measuring accuracy, and/or measuring resolution of the power measuring circuitry. For example, if the power measuring circuitry have a measuring error, e.g., in the approximate range of 1 to 5%, the measured operational power may be adjusted to include the measuring error. The extra power may be added to include a design margin for a temperature and a margin to a future higher power code. The adjusted power may be used to provide entries to power look-up tables of the computer system, e.g., as described above with respect to FIGS. 6, 7, 21, and 22. The adjusted operational power values may be used to operate the subsystem. Next, at operation 3405 the operational power for the subsystem is provided to a power lookup table of a computer system. In one embodiment, the power look up table of the computer system may be a power look up table as described above with respect to FIGS. 6, 7, 21, and 22. Next, at operation 3406 determination is made whether to operate the system at a next performance point, e.g., at another frequency, another temperature, or both. Operations 3401-3405 are repeated, if the subsystem is needed to operate at the next performance point. If the subsystem is not needed to operate at the next performance point, method 3400 continues with operation 3407 of using the operational power points to operate the subsystem or to store values in power distribution tables for use in machines to be manufactured.

FIG. 35 is a flowchart of another embodiment of a method of using intermediate operational power points to distribute power in a computer system. Method 3500 begins with operation 3501 of operating one or more subsystems of a computer system at well-known conditions at one or more performance points. In operation 3502 the power consumed by each of the one or more subsystems at each of the one or more performance points is measured. In one embodiment, measuring the power consumed by each of the subsystems is performed in parallel. For example, when the subsystems are operated at the same time, the measuring may be performed in parallel using one or more sensors coupled to the one or more subsystems. In another embodiment, measuring the power consumed by each of the subsystems is performed in series. For example, when one subsystem at a time is operated at the well-known conditions, measuring may be performed in series using one or more sensors coupled to the subsystems. Next, determining operational powers for each of the one or more subsystems is performed in operation 3503. Next, distributing the power among the subsystems of the computer system is performed based on the operational powers of each of the one or more subsystems in operation 3504. Accurate knowledge of the intermediate powers at each of the performance points allow for designs that carefully adjust the performance of each of the subsystems in the computer system to allow maximum possible performance under a current set of constraints, e.g., thermal or electrical power constraints, for the computer system. The measuring of intermediate operational powers and the incorporating of the results of these measurements provide a platform specific basis for power distribution and balancing in one or more subsystems of the computer system. In one embodiment, the platform specific intermediate operational powers may be determined as a part of the factory test process and written into the system management controller ("SMC") of the computer system for use in the power balancing algorithm. In another embodiment, the platform specific intermediate operational powers may be determined periodically during a life time of a computer system, and stored in SMC. Next, at operation 3504, distributing the power among the subsystems of a computer system is performed based on the operational powers allocated to each of the subsystems to balance the power in the computer system. In one embodiment, power look up tables may be built that include the measured actual power consumed by each of the subsystems at maximum-power conditions and at a set of performance points to distribute and balance the power among the subsystems at different computer system settings. In one embodiment, the measured actual power values consumed by each of the subsystems at maximum-power conditions and at a set of performance points are entered into the power look-up table as the power values allocated to the each of the subsystems at various settings.

Figure 36:
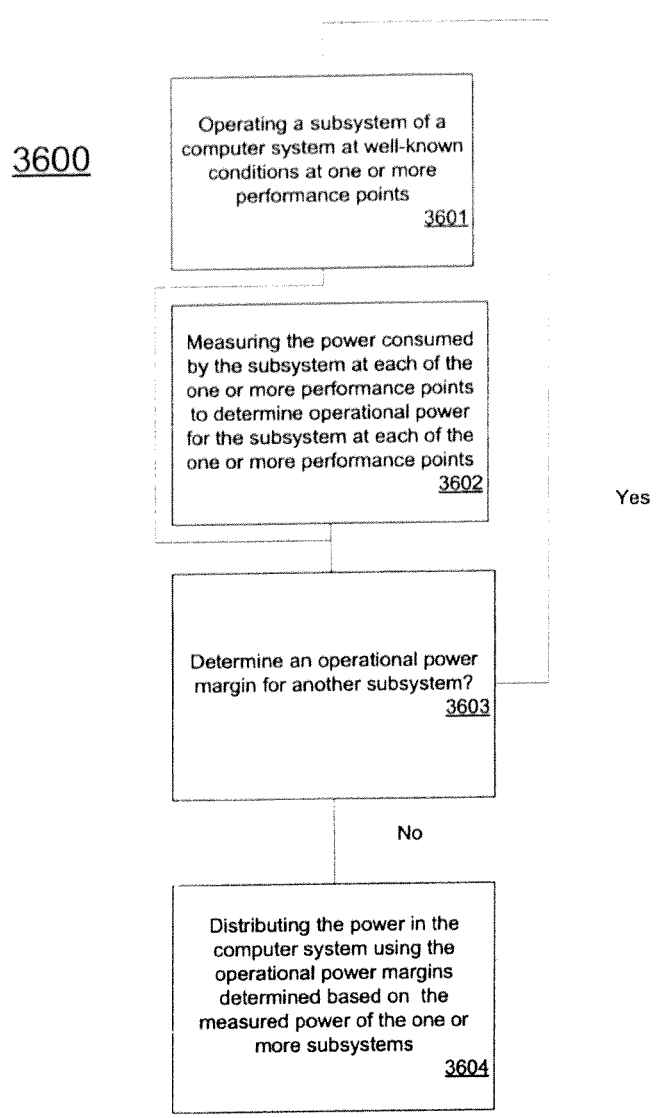
FIG. 36 is a flowchart of one embodiment of a method of determining intermediate operational power points of one or more subsystems of a computer system.

FIG. 36 is a flowchart of one embodiment of a method of determining intermediate operational powers of one or more subsystems of a computer system. This method begins with operation 3601 which involves operating a subsystem of a computer system at well-known conditions at one or more performance points. In operation 3602 the power consumed by the subsystem at each of the one or more performance points is measured to determine operational powers for the subsystem at each of the one or more performance points. Next, determination is made at operation 3603 whether operational power is to be determined for another subsystem. If the operational power is to be determined for another subsystem, method 3600 returns to performing operations 3601-3602 for another subsystem. If the operational power for another subsystem does not need to be determined, method 3600 continues with operation 3604 of distributing the power in the computer system using the operational powers determined based on the measured power of the one or more subsystem.

Figure 37:
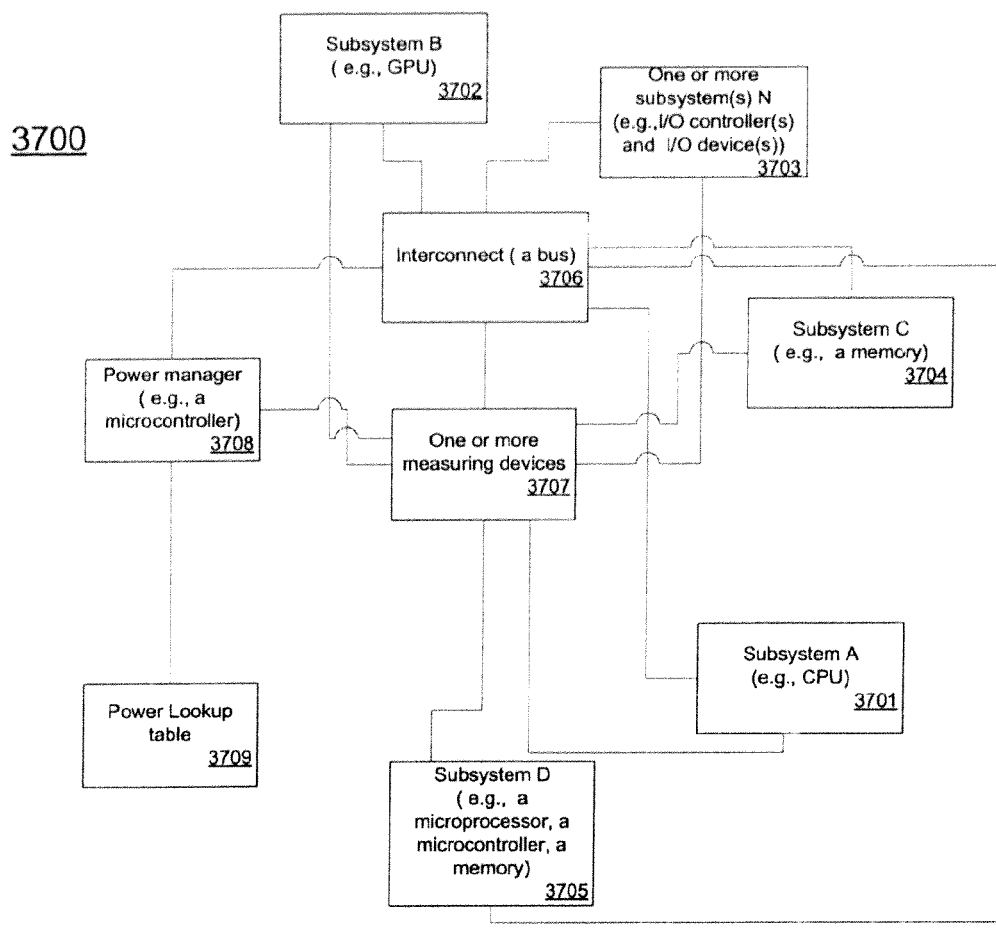
FIG. 37 illustrates one embodiment of a system that leverages intermediate operational power points.

FIG. 37 illustrates one embodiment of a system that leverages intermediate operational power margins and distributes the power as described above with respect to FIGS. 33-36. As shown in FIG. 37 system 3700 includes a subsystem A 3701, e.g., a CPU, a subsystem B 3702, e.g., a GPU that may be coupled with a display device, subsystem C 3704, e.g., a memory, subsystem D) 3705, e.g., a microprocessor, and one or more subsystems N 3703, e.g., one or more I/O controllers coupled to one or more I/O devices, a power manager 3708, e.g., a microcontroller, a system management controller ("SMC"), coupled to a interconnect 3706, e.g, a bus. Subsystem C 3704 may be a volatile RAM, a non-volatile memory, e.g., a hard drive, and/or a ROM. One or more measuring devices 3707, e.g., one or more sensors as described above with respect to FIGS. 4, 5, 12, 17, 24, and 32 are coupled to subsystems 3701-3705, and to power manager 3708, as shown in FIG. 37. A power look-up table 3709 that may include a power distribution table, as described above with respect to FIGS. 7, 21, and 22, is coupled to power manager 3708, as shown in FIG. 37. Components of the system 3700, including processors, microcontrollers, buses, I/O controllers, I/O devices, memories, sensors are described in detail above with respect to FIGS. 1-17. In one embodiment, one or more power lookup tables corresponding to various performance settings of the computer system as described above with respect to FIGS. 1-36, may be generated by subsystem 3701 (or generated by test equipment in the design and/or manufacturing process), and stored in memory 3704, and/or in a memory located in power manager 3708. In one embodiment, power manager 3708 performs methods described above with respect to FIGS. 33-36. In another embodiment, subsystem 3701 performs methods described above with respect to FIGS. 33-36.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to set a target temperature of a heat sink, comprising:
monitoring a temperature of a heat sink;
receiving, via an electrical pin of an integrated circuit chip, a component-specific electrical signal asserted by logic circuitry of the integrated circuit chip, wherein the integrated circuit chip is thermally coupled to the heat sink, and wherein the component-specific electrical signal is asserted in response to a current temperature of the integrated circuit chip equaling or exceeding a component-specific threshold temperature for the integrated circuit chip;
adjusting a target temperature of the heat sink to an adjusted target temperature based on the assertion of the component-specific electrical signal; and
adjusting an operation of the integrated circuit chip, a cooling unit coupled to the heat sink, or both based on whether the monitored temperature of the heat sink is above the adjusted target temperature of the heat sink.

2. The method of claim 1, wherein adjusting the operation of the integrated circuit chip includes changing a frequency of the integrated circuit chip, a voltage of the integrated circuit chip, or both.

3. The method of claim 1, wherein adjusting the cooling unit includes changing a speed of a fan.

4. The method of claim 1, wherein adjusting the target temperature comprises:
decreasing the target temperature if the component-specific electrical signal is asserted by the logic circuitry for longer than a predetermined fraction of time over a predetermined time interval.

5. The method of claim 1, wherein adjusting the target temperature comprises:
increasing the target temperature if the component-specific electrical signal is asserted by the logic circuitry for shorter than a predetermined fraction of time over a predetermined time interval.

6. The method of claim 1, wherein the component-specific electrical signal indicates that the current temperature of the integrated circuit chip exceeds a threshold value for the integrated circuit chip.

7. A data processing system, comprising:
an integrated circuit chip;
a heat sink thermally coupled to the integrated circuit chip;
a sensor coupled to the heat sink; and
a thermal controller coupled to the integrated circuit chip, wherein the thermal controller is to receive, via an electrical pin of the integrated circuit chip, a component-specific electrical signal asserted by logic circuitry of the integrated circuit chip, wherein the component-specific electrical signal is asserted in response to a current temperature of the integrated circuit chip equaling or exceeding a component-specific threshold temperature for the integrated circuit chip, and wherein the thermal controller is to adjust a target temperature of the heat sink to an adjusted target temperature based on the assertion of the component-specific electrical signal.

8. The system of claim 7, wherein the thermal controller adjusts the target temperature by decreasing the target temperature if the component-specific electrical signal is asserted for longer than a predetermined fraction of time over a predetermined time interval.

9. The system of claim 7, wherein the thermal controller adjusts the target temperature by increasing the target temperature if the component-specific electrical signal is asserted for shorter than a predetermined fraction of time over a predetermined time interval.

10. The system of claim 7, wherein the thermal controller operates a temperature control loop of the heat sink.

11. The system of claim 7, wherein the thermal controller receives the component-specific electrical signal that indicates the current temperature control of the integrated circuit chip, wherein the thermal controller measures a temperature of the heat sink, and wherein the thermal controller determines a difference between the measured temperature of the heat sink and a maximum temperature of the integrated circuit chip.

12. The system of claim 11, wherein the thermal controller sets a baseline target temperature of the heat sink based on the difference.

13. The system of claim 11, wherein the thermal controller sets tolerance parameters based on the difference.

14. An article of manufacture comprising:
a machine-accessible medium including executable program instructions that, when executed by a machine, cause the machine to perform operations comprising,
monitoring a temperature of a heat sink;
receiving, via an electrical pin of an integrated circuit chip, a component-specific electrical signal asserted by logic circuitry of the integrated circuit chip, wherein the integrated circuit chip is thermally coupled to the heat sink, and wherein the component-specific electrical signal is asserted in response to a current temperature of the integrated circuit chip equaling or exceeding a component-specific threshold temperature for the integrated circuit chip;
adjusting a target temperature of the heat sink to an adjusted target temperature based on the assertion of the component-specific electrical signal; and
adjusting an operation of the integrated circuit chip, a cooling unit coupled to the heat sink, or both based on whether the monitored temperature of the heat sink is above the adjusted target temperature of the heat sink.

15. The article of manufacture of claim 14, wherein adjusting the operation of the integrated circuit chip includes changing a frequency of the integrated circuit chip, a voltage of the integrated circuit chip, or both.

16. The article of manufacture of claim 14, wherein adjusting the cooling unit includes changing a speed of a fan.

17. The article of manufacture of claim 14, wherein adjusting the target temperature comprises:
decreasing the target temperature if the component-specific electrical signal is asserted by the logic circuitry for longer than a predetermined fraction of time over a predetermined time interval.

18. The article of manufacture of claim 14, wherein adjusting the target temperature comprises:
increasing the target temperature if the component-specific electrical signal is asserted by the logic circuitry for shorter than a predetermined fraction of time over a predetermined time interval.

19. A system, comprising:
means for monitoring a temperature of a heat sink;
means for asserting a component-specific electrical signal for an electrical pin of an integrated circuit chip thermally coupled to the heat sink, wherein the component-specific electrical signal is asserted in response to a current temperature of the integrated circuit chip equaling or exceeding a component-specific threshold temperature for the integrated circuit chip;

means for adjusting a target temperature of the heat sink to an adjusted target temperature based on the assertion of the component-specific electrical signal; and means for adjusting an operation of the integrated circuit chip, a cooling unit coupled to the heat sink, or both based on whether the monitored temperature of the heat sink is above the adjusted target temperature of the heat sink.

20. The method of claim 1, wherein receiving the component-specific electrical signal asserted by the logic circuitry of the integrated circuit chip comprises receiving the component-specific electrical signal via a pin out of the integrated circuit chip.

21. The data processing system of claim 7, wherein receiving the component-specific electrical signal asserted by the logic circuitry of the integrated circuit chip comprises receiving the component-specific electrical signal via a pin out of the integrated circuit chip.

22. The article of manufacture of claim 14, wherein receiving the component-specific electrical signal asserted by the logic circuitry of the integrated circuit chip comprises receiving the component-specific electrical signal via a pin out of the integrated circuit chip.

* * * * *